(12) United States Patent
Pelz et al.

(10) Patent No.: US 11,352,373 B2
(45) Date of Patent: Jun. 7, 2022

(54) APPARATUS AND CONTINUOUS FLOW PROCESS FOR PRODUCTION OF BORONIC ACID DERIVATIVE

(71) Applicant: Melinta Subsidiary Corp., Morristown, NJ (US)

(72) Inventors: Andreas Pelz, Lincolnshire, IL (US); Christian Schuster, Lincolnshire, IL (US); Stefan Steinhofer, Lincolnshire, IL (US); Clemens Stueckler, Lincolnshire, IL (US); Maria Vasiloiu, Lincolnshire, IL (US); Christopher Zinganell, Lincolnshire, IL (US)

(73) Assignee: MELINTA SUBSIDIARY CORP., Morristown, NJ (US)

( * ) Notice: Subject to any disclaimer, the term of this patent is extended or adjusted under 35 U.S.C. 154(b) by 51 days.

(21) Appl. No.: 16/482,195

(22) PCT Filed: Jan. 31, 2018

(86) PCT No.: PCT/US2018/016246
§ 371 (c)(1),
(2) Date: Jul. 30, 2019

(87) PCT Pub. No.: WO2018/144607
PCT Pub. Date: Aug. 20, 2018

(65) Prior Publication Data
US 2020/0115393 A1    Apr. 16, 2020

Related U.S. Application Data

(60) Provisional application No. 62/453,408, filed on Feb. 1, 2017.

(51) Int. Cl.
| | | |
|---|---|---|
| C07F 5/02 | (2006.01) | |
| B01J 19/00 | (2006.01) | |
| B01J 19/02 | (2006.01) | |
| B01J 19/24 | (2006.01) | |

(52) U.S. Cl.
CPC ........... *C07F 5/027* (2013.01); *B01J 19/0013* (2013.01); *B01J 19/02* (2013.01); *B01J 19/248* (2013.01); *B01J 2219/00033* (2013.01); *B01J 2219/00099* (2013.01); *B01J 2219/0286* (2013.01)

(58) Field of Classification Search
CPC .. B01J 2219/00033; C07F 5/027; C07F 5/025
USPC ........................................................ 558/288
See application file for complete search history.

(56) References Cited

U.S. PATENT DOCUMENTS

2014/0194382 A1    7/2014  Reddy et al.

FOREIGN PATENT DOCUMENTS

| CO | 6930354 A2 | 4/2014 | |
|---|---|---|---|
| CO | 2018013978 A2 | 2/2019 | |
| WO | WO-87/05297 A1 | 9/1987 | |
| WO | WO2012/021455 A1 | 2/2012 | |
| WO | WO-2013040479 A1 | 3/2013 | |
| WO | WO-2014107535 A1 * | 7/2014 | ........... A61K 31/546 |
| WO | WO-2015/171430 A1 | 11/2015 | |
| WO | WO-2015179308 A1 | 11/2015 | |
| WO | WO-2016003929 A1 | 1/2016 | |
| WO | WO-2016081297 A1 | 5/2016 | |
| WO | WO-2016/100043 A1 | 6/2016 | |
| WO | WO-2018005662 A1 | 1/2018 | |
| WO | WO-2018/144607 A1 | 8/2018 | |

OTHER PUBLICATIONS

International Search Report and Written Opinion dated Apr. 24, 2018 by Australian Patent Office as International Searching Authority for International Patent Application No. PCT/US2018/016246 filed on Jan. 31, 2018 (9 total pages).

International Preliminary Report on Patentability dated Aug. 15, 2019 by International Bureau of WIPO for International Patent Application No. PCT/US2018/016246 filed on Jan. 31, 2018 (6 total pages).

Office Action dated Mar. 24, 2022 by Columbian Patent Office in Columbian Patent Application No. NC2019/0009018 with English Translation (16 total pages).

* cited by examiner

*Primary Examiner* — Joseph R Kosack
*Assistant Examiner* — Sagar Patel
(74) *Attorney, Agent, or Firm* — Wilmer Cutler Pickering Hale and Dorr LLP

(57) ABSTRACT

A process for a continuous production of a boronic acid derivative and an apparatus of performing the process are disclosed.

46 Claims, 2 Drawing Sheets

APPARATUS AND CONTINUOUS FLOW PROCESS FOR PRODUCTION OF BORONIC ACID DERIVATIVE

INCORPORATION BY REFERENCE TO PRIORITY APPLICATION

The present application is a National Stage Entry of PCT International Application Number PCT/US2018/016246, filed Jan. 31, 2018, which claims the benefit of priority to U.S. Provisional Application No. 62/453,408, filed Feb. 1, 2017, both of which are incorporated by reference in their entireties.

STATEMENT REGARDING FEDERALLY SPONSORED R&D

This invention was made with Government support under contract HHSO100201400002C awarded by the U.S. Department of Health and Human Services. The Government has certain rights in the invention.

BACKGROUND

Field

The present disclosure relates to a continuous flow process for production of boronic acid derivatives and apparatus of performing the same. More particularly, it relates to a continuous flow process for a large scale production of boronic acid derivatives.

Description of the Related Art

Boronic acid derivatives are useful as potentiators of antimicrobial compounds. Some methods for α-acylamidoboronic ester synthesis include the addition of the lithium salt of an amine and rearrangement followed by an amide coupling reaction. However, maintenance of low temperature, exclusion of water and careful control of stoichiometry of the reagents are required for good results. These features render the reaction difficult to perform successfully on a production scale, and limit the availability of pharmaceutically important boronic ester and acid compounds. Thus, there remains a need for a process for the easy scale-up production of α-acylamidoboronic acid derivatives.

SUMMARY

Some embodiments relate to a process for production of a compound of Formula (Ia) or (Ib) or salt thereof,

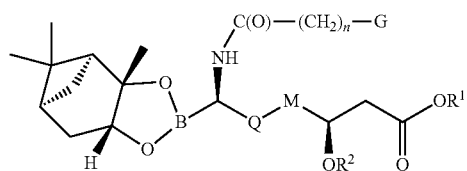

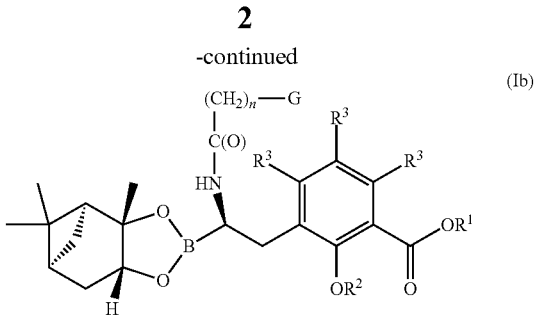

wherein:
Q is —$(CH_2)_m$—;
M is —$CH_2$— or —CH=CH—;
m is 1 or 2;
$R^1$ is a carboxyl protecting group;
$R^2$ is a hydroxyl protecting group; or
$R^1$ and $R^2$ together with the atoms to which they are attached form a five-member heterocyclic ring optionally substituted with $C_{1-4}$ alkyl;
each $R^3$ is independently selected from hydrogen, —OH, halogen, —$CF_3$, $C_1$-$C_6$ alkenyl, $C_1$-$C_6$ alkynyl, $C_1$-$C_6$ heteroalkyl, $C_3$-$C_7$ carbocyclyl, 5-10 membered heterocyclyl, $C_{6-10}$ aryl, 5-10 membered heteroaryl, cyano, $C_1$-$C_6$ alkoxy($C_1$-$C_6$)alkyl, $C_{6-10}$ aryloxy, sulfhydryl (mercapto), and —$(CH_2)_m$—Y'—$(CH_2)_p$M';
m and p are independently 0 to 3;
Y' is selected from the group consisting of —S—, —S(O)—, —$S(O)_2$—, —O—, —$CR^{4a}R^{5a}$—, and —$NR^{1a}$—;
M' is selected from the group consisting of —C(O)$NR^{1a}R^{2a}$; —C(O)$NR^{1a}OR^{3a}$; —$NR^{1a}C(O)R^{4a}$; —$NR^1C(O)NR^{2a}R^{1b}$; —$NR^1C(O)OR^{3a}$; —$NR^1S(O)_2R^{3a}$; —$NR^{1a}S(O)_2NR^{2a}R^{1b}$; —C(=$NR^1$)$R^{4a}$; —C(=$NR^{1a}$)$NR^{2a}R^{1b}$; —$NR^{1a}CR^{4a}$(=$NR^{2a}$); —$NR^{1a}C$(=$NR^{2a}$)$NR^{1b}R^{2b}$; $C_{1-4}$ alkyl optionally substituted with 0-2 substituents selected from the group consisting, —$OR^{3a}$, —$NR^{1a}R^{2a}$, halogen, —C(O)$NR^{1a}R^{2a}$, and —$NR^{1a}C(O)R^{4a}$; $C_{3-10}$ cycloalkyl optionally substituted with 0-2 substituents selected from the group consisting of $C_{1-4}$ alkyl, —$OR^{3a}$, —$NR^{1a}R^{2a}$, halogen, —C(O)$NR^{1a}R^{2a}$, and —$NR^{1a}C$(O)$R^{4a}$; $C_{6-10}$ aryl optionally substituted with 0-2 substituents selected from the group consisting of $C_{1-4}$ alkyl, —$OR^{3a}$, —$NR^{1a}R^{2a}$, halogen, —C(O)$NR^{1a}R^{2a}$, and —$NR^{1a}C(O)R^{4a}$; 5 to 10 membered heteroaryl optionally substituted with 0-2 substituents selected from the group consisting of $C_{1-4}$ alkyl, —$OR^{3a}$, —$NR^{1a}R^{2a}$, halogen, —C(O)$NR^{1a}R^{2a}$, and —$NR^{1a}C(O)R^{4a}$; and 4 to 10 membered heterocyclyl optionally substituted with 0-2 substituents selected from the group consisting of $C_{1-4}$ alkyl, —$OR^{3a}$, —$NR^{1a}R^{2a}$, halogen, —C(O)$NR^{1a}R^{2a}$, and —$NR^{1a}C(O)R^{4a}$;
each $R^{1a}$, $R^{2a}$, $R^{1b}$ and $R^{2b}$ are independently selected from the group consisting of —H, optionally substituted —$C_{1-10}$alkyl, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl;
$R^{3a}$ is hydrogen, optionally substituted $C_{1-10}$alkyl, -optionally substituted $C_{1-10}$alkyl-COOH, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl; and each $R^{4a}$ and $R^{5a}$ is independently selected from the group consisting of —H, —OH, -optionally substituted alkoxyl, optionally substituted —$C_{1-10}$alkyl, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl;

n is 0 to 3;

G is selected from the group consisting of —$NR^1R^2$, —$N_3$, —$C(O)NR^1R^2$, —$S(O)_2NR^1R^2$, —$SR^3$, —$OR^3$, —$NR^1C(O)R^5$, —$C(=NOR^3)$—X, $C(=NOR^3)$—Z, —$C(O)OR^3$, —$C(O)NR^1(OR^3)$, —$NR^1(OR^3)$, —$NR^1C(O)R^5$, —$NR^1C(O)NR^2R^{1a}$, —$NR^1C(O)OR^3$, —$NR^1S(O)_2R^3$, —$NR^1S(O)_2NR^2R^{1a}$, —$NR^1NR^2R^{1a}$, —$C(O)NR^1NR^2R^{1a}$, —$S(O)_2NR^1NR^2R^{1a}$, —$C(=NR^1)R^5$, —$C(=NR^1)NR^2R^{1a}$, —$NR^1CR^5$ (=$NR^2$), —$NR^1C(=NR^2)NR^{1a}R^{2a}$, optionally substituted $C_{1-10}$ alkyl, optionally substituted $C_{2-10}$alkenyl, optionally substituted $C_{2-10}$alkynyl, optionally substituted $C_{3-7}$ carbocyclyl, optionally substituted 5-10 membered heterocyclyl, optionally substituted $C_{6-10}$aryl, optionally substituted 5-10 membered heteroaryl, optionally substituted $C_{1-6}$alkylene-$C_{3-7}$carbocyclyl, optionally substituted $C_{1-6}$alkylene-5-10 membered heterocyclyl, optionally substituted $C_{1-6}$alkylene-$C_{6-10}$aryl, and optionally substituted $C_{1-6}$alkylene-5-10 membered heteroaryl;

X is hydrogen or optionally substituted $C_{1-9}$alkyl;

Z is selected from optionally substituted $C_{3-8}$ cycloalkyl, optionally substituted heterocyclyl, optionally substituted aryl, optionally substituted heteroaryl;

the process comprising:
providing a continuous flow of a lithium amide;
providing a continuous flow of a compound of Formula (IIa) or (IIb) or salt thereof;

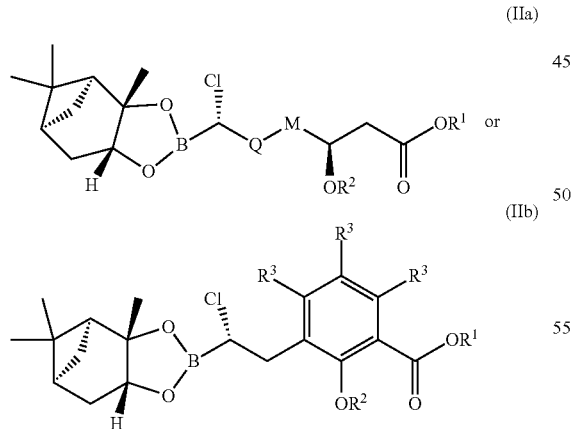

combining the continuous flow of the lithium amide and the continuous flow of the compound of Formula (IIa) or (IIb) at a first continuous flow conduit at a first temperature to yield a first reaction intermediate;
transitioning the first reaction intermediate to a second temperature to yield a second reaction intermediate; and combining the second reaction intermediate and a compound of Formula (III) downstream of the second continuous flow conduit to yield the compound of Formula (Ia) or (Ib) or salt thereof

wherein A is a $C_{6-10}$aryl, 5-10 membered heteroaryl, $C_{3-7}$carbocyclyl, or 5-10 membered heterocyclyl.

Some embodiments relate to an apparatus for production of a compound of Formula (Ia) or (Ib) or salt thereof,

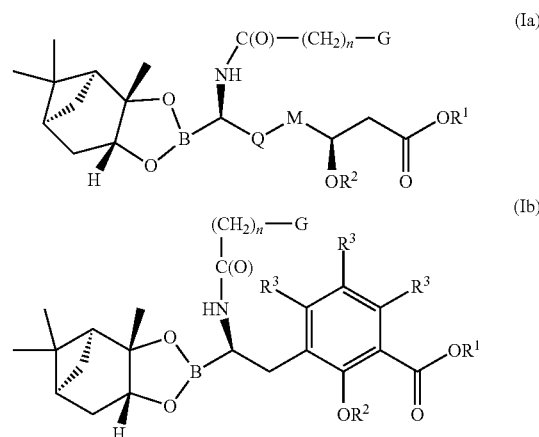

the apparatus comprising:
a first vessel comprising a lithium amide;
a second vessel comprising a compound of Formula (IIa) or (IIb) or salt thereof;

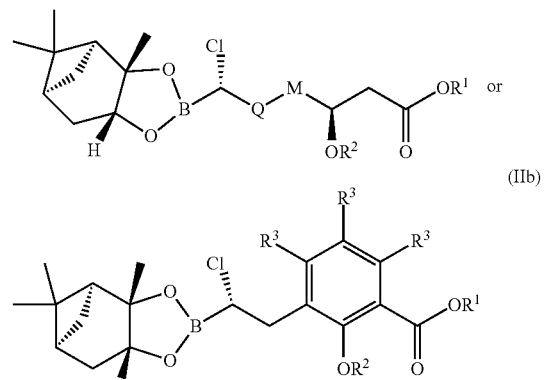

a third vessel comprising a compound of Formula (III) or salt thereof;

wherein A is a $C_{6-10}$aryl, 5-10 membered heteroaryl, $C_{3-7}$carbocyclyl, or 5-10 membered heterocyclyl;

a first continuous flow conduit fluidly coupled to the first vessel and the second vessel; and
a second continuous conduit fluidly coupled between the first continuous flow conduit and the third vessel.

DETAILED DESCRIPTION OF THE PREFERRED EMBODIMENT

Figure 1:
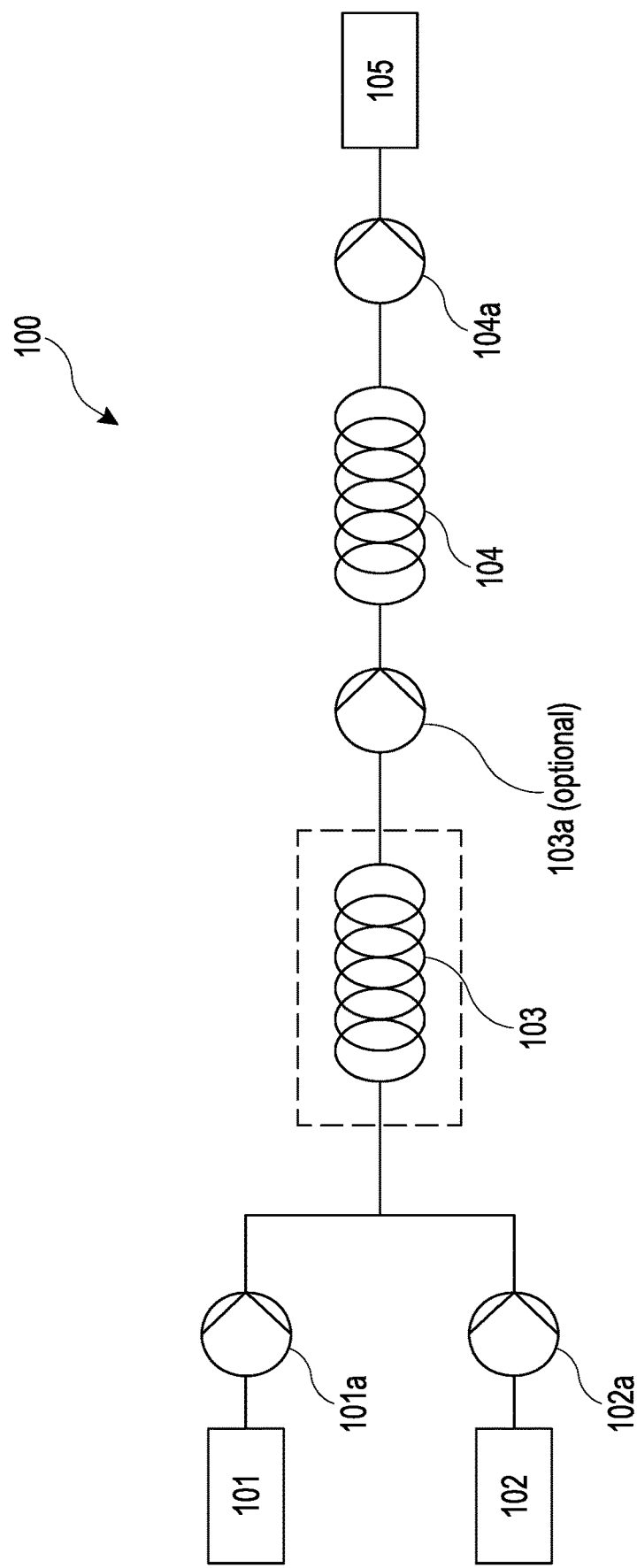
FIG. 1 illustrates a non-limiting schematic of a continuous flow apparatus.

The disclosed technology relates to a continuous flow process for the production of boronic acid derivatives. The process allows a continuous production of boronic acid derivatives with a high yield and simplified steps. In particular, the process specifically provides for the production of a key reaction intermediate in a process to prepare useful boronic acid derivatives. In some embodiments, the reaction intermediate has the structure of Compound A:

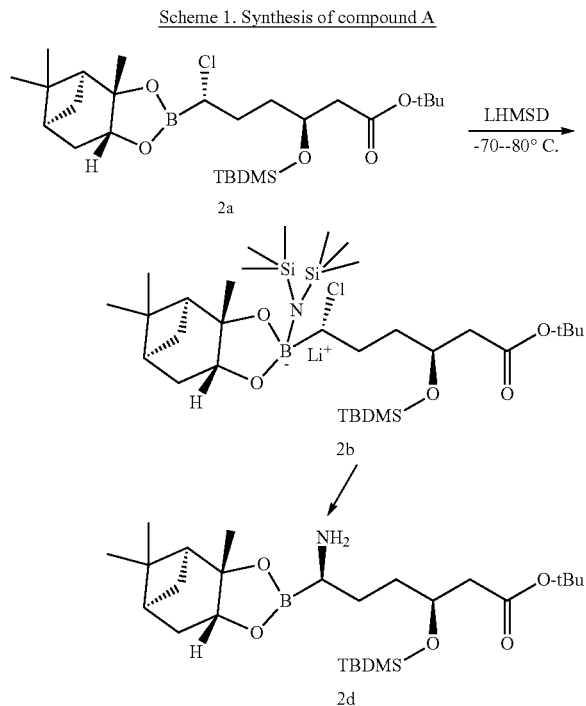

Compound A

The batch process for the synthesis of Compound A involves a LHMDS mediated addition/arrangement reaction of compound 2a, followed by an EDCl/HOBt mediated amide coupling reaction of compound 2d with an ester (e.g., a thienylacetic acid compound 2e) as shown in Scheme 1.

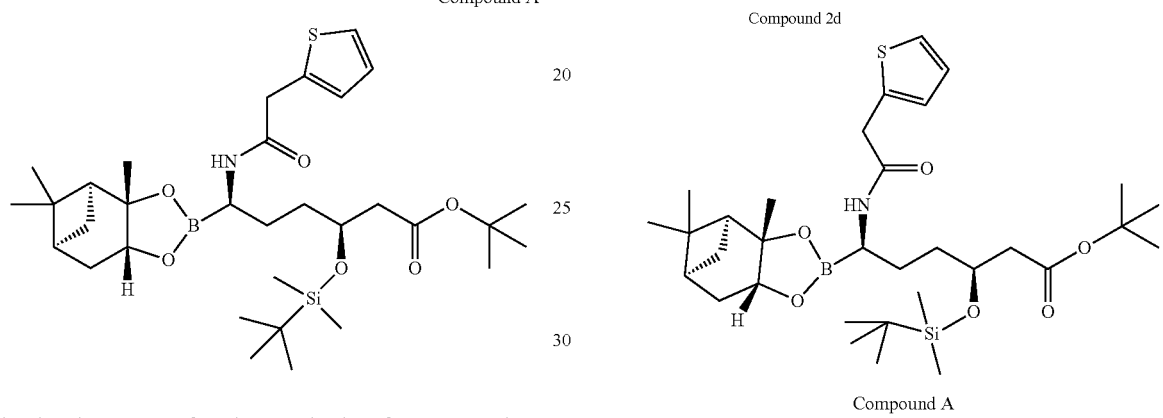

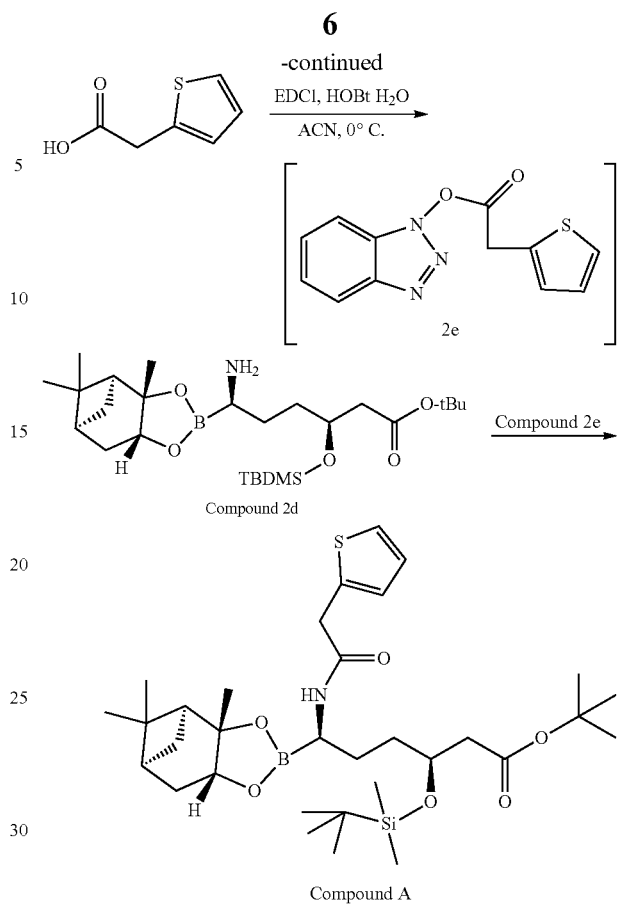

Compound A

The continuous process described herein allows for continuous synthesis of a first reaction intermediate (e.g., compound 2b) and a second reaction intermediate (e.g., compound 2d), with a high or full conversion of the starting reagent, the compound of formula (IIa) or (IIb) (e.g. compound 2a). Because of the full conversion of the starting reagent (e.g. compound 2a), the continuous flow containing the second reaction intermediate (e.g., compound 2d) can be added directly into a vessel that has a compound of formula III (e.g., compound 2e) or the reagents used to make a compound of formula III (e.g., HOBt/EDCl mediated amidation with a 2-thienylacetic acid for making compound 2e). Therefore, the process described herein allows for synthesis of compound A from the starting material compound of formula (IIa) or (IIb) without the need to separate or purify the reaction intermediate or the compound of formula III (e.g., the reaction intermediate compound 2d and/or the compound of formula III). This process and apparatus for conducting this process simplifies the synthesis steps and leads to an increased productivity. They also lead to better scalability, energy efficiency, shorter production time, and fewer reaction vessels required.

Some embodiments include production of the second reaction intermediate (e.g., compound 2d) and the compound of formula (III) (e.g., compound 2e) in parallel, which can then be reacted together to produce a compound of formula (Ia) or (Ib) (e.g. Compound A) without the need to purify each compound prior to reaction. The process described herein leads to better scalability and energy efficiency as well as saving reaction time and reaction vessels.

In some embodiments, the process operates under cryogenic conditions; however, reaction temperatures below −70° C. used for batch production can be avoided. In some embodiments, temperatures of −30° C. can be used to provide a more readily scalable process with better reproducibility and higher yield. In some embodiments, the compound of formula (IIa) or (IIb) (e.g., compound 2a) could be driven to full conversion, and the reaction flow carrying the second reaction intermediate (e.g., compound 2d) can be directly added to a reaction vessel in which the compound of formula (III) is made without the need to purify the second reaction intermediate or the compound of formula (III) prior to reaction of the two together.

The chiral boronic ester compound A is an intermediate in the synthesis of Compound B, a β-lactamase inhibitor.

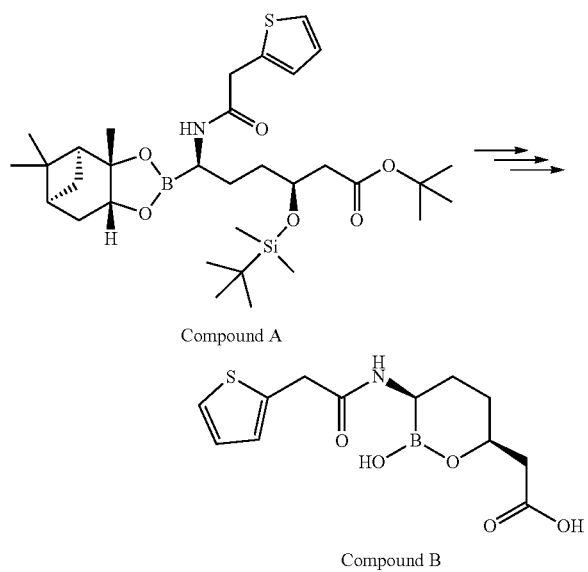

Compound A

Compound B

In a batch process, all the operations are performed in successive steps using one or more reactors, and the increase in production scale in a batch production often results in lower yield, higher level of impurities, and poor reproducibility and selectivity for stereoisomers. In addition, large reactor volumes also may correspond to increase in capital investments.

In a continuous process, separate continuous flow conduits are used for each step of the reaction, and the reaction mixture flows from one operation to the next within the production line. The operations are performed continuously and some of the reaction parameters such as flow rate, molar ratio, and reaction temperatures can be easily and quickly adjusted based on a concurrent monitoring of the reaction product. Consequently, a continuous production process requires much smaller equipment volumes for achieving the same production capacity. In addition, a continuous operation helps to ensure the quality of the product. Moreover, a continuous flow process may be preferable over a traditional batch process as it would mitigate the risks that are associated with potentially hazardous decomposition or other side reactions of the lithium amide. The shorter residence times in continuous flow set-up can allow operation at higher temperatures. Furthermore, the continuous process described herein achieves full or near full conversion of the second reaction intermediate, which makes it possible to add the continuous flow containing the second reaction intermediate directly to the vessel containing the compound of Formula (III) without any purification or separation of the second reaction intermediate.

A continuous flow process and the apparatus for performing the continuous flow process are often complicated to design and highly specific to the types of reaction product and production rate. The continuous flow process described herein, by utilizing a continuous flow process to produce a reaction intermediate and performing the last amidation step in a non-continuous-flow vessel, has shown great reproducibility and high yield as compared to the other types continuous flow processes that involve performing the last quenching step inside a continuous flow conduit. Additionally, the continuous flow process described herein has allowed successful production of the compound of formula I, particularly compound A in a large scale with a high yield.

Definitions

The term "substantially free of water" as used herein means a product has been dried using standard techniques known in the art. In some embodiments, "substantially free of water" means the product contains less than 0.5%, 1%, 3%, or 5% of water. In some embodiments, "substantially free of water" means the product contains less than 0.1% of water or no water.

The term "continuous flow conduit" as used herein refers to any pipe, tube, channel, channeled plate, or any other vessel of suitable shape for conveying fluids in a continuous flow process.

The term "residence time" as used herein refers to the time required for the reaction mixture or stock solution to flow from the input to the output of a continuous flow conduit.

The term "thermally coupled" as used herein refers to a direct or indirect coupling between two objects in way that facilitates heat transfer between the two objects. For example, when a vessel or continuous flow conduit is thermally coupled to a cooling bath, the vessel or continuous flow conduit can be immersed in the cooling bath to achieve a desired temperature.

The term "fluidly coupled" as used herein means that a first component are in fluid communication with another component. Such fluid communication may be achieved by either direct or indirect connection via valves, pipes, conveyors, pumps, conduits and any other suitable connectors known by those skilled in the art.

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

The term "halogen" or "halo," as used herein, means any one of the radio-stable atoms of column 7 of the Periodic Table of the Elements, e.g., fluorine, chlorine, bromine, or iodine, with fluorine and chlorine being preferred.

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group of the compounds may be designated as "$C_{1-4}$ alkyl" or similar designations. By way of example only, "$C_{1-4}$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkoxy" refers to the formula —OR wherein R is an alkyl as is defined above, such as "$C_{1-9}$ alkoxy", including but not limited to methoxy, ethoxy, n-propoxy, 1-methylethoxy (isopropoxy), n-butoxy, iso-butoxy, sec-butoxy, and tert-butoxy, and the like.

As used herein, "alkylthio" refers to the formula —SR wherein R is an alkyl as is defined above, such as "$C_{1-9}$ alkylthio" and the like, including but not limited to methylmercapto, ethylmercapto, n-propylmercapto, 1-methylethylmercapto (isopropylmercapto), n-butylmercapto, iso-butylmercapto, sec-butylmercapto, tert-butylmercapto, and the like.

As used herein, "alkenyl" refers to a straight or branched hydrocarbon chain containing one or more double bonds. The alkenyl group may have 2 to 20 carbon atoms, although the present definition also covers the occurrence of the term "alkenyl" where no numerical range is designated. The alkenyl group may also be a medium size alkenyl having 2 to 9 carbon atoms. The alkenyl group could also be a lower alkenyl having 2 to 4 carbon atoms. The alkenyl group of the compounds may be designated as "$C_{2-4}$ alkenyl" or similar designations. By way of example only, "$C_{2-4}$ alkenyl" indicates that there are two to four carbon atoms in the alkenyl chain, i.e., the alkenyl chain is selected from the group consisting of ethenyl, propen-1-yl, propen-2-yl, propen-3-yl, buten-1-yl, buten-2-yl, buten-3-yl, buten-4-yl, 1-methyl-propen-1-yl, 2-methyl-propen-1-yl, 1-ethyl-ethen-1-yl, 2-methyl-propen-3-yl, buta-1,3-dienyl, buta-1,2,-dienyl, and buta-1,2-dien-4-yl. Typical alkenyl groups include, but are in no way limited to, ethenyl, propenyl, butenyl, pentenyl, and hexenyl, and the like.

As used herein, "alkynyl" refers to a straight or branched hydrocarbon chain containing one or more triple bonds. The alkynyl group may have 2 to 20 carbon atoms, although the present definition also covers the occurrence of the term "alkynyl" where no numerical range is designated. The alkynyl group may also be a medium size alkynyl having 2 to 9 carbon atoms. The alkynyl group could also be a lower alkynyl having 2 to 4 carbon atoms. The alkynyl group of the compounds may be designated as "$C_{2-4}$ alkynyl" or similar designations. By way of example only, "$C_{2-4}$ alkynyl" indicates that there are two to four carbon atoms in the alkynyl chain, i.e., the alkynyl chain is selected from the group consisting of ethynyl, propyn-1-yl, propyn-2-yl, butyn-1-yl, butyn-3-yl, butyn-4-yl, and 2-butynyl. Typical alkynyl groups include, but are in no way limited to, ethynyl, propynyl, butynyl, pentynyl, and hexynyl, and the like.

As used herein, "heteroalkyl" refers to a straight or branched hydrocarbon chain containing one or more heteroatoms, that is, an element other than carbon, including but not limited to, nitrogen, oxygen and sulfur, in the chain backbone. The heteroalkyl group may have 1 to 20 carbon atoms although the present definition also covers the occurrence of the term "heteroalkyl" where no numerical range is designated. The heteroalkyl group may also be a medium size heteroalkyl having 1 to 9 carbon atoms. The heteroalkyl group could also be a lower heteroalkyl having 1 to 4 carbon atoms. The heteroalkyl group of the compounds may be designated as "$C_{1-4}$ heteroalkyl" or similar designations. The heteroalkyl group may contain one or more heteroatoms. By way of example only, "$C_{1-4}$ heteroalkyl" indicates that there are one to four carbon atoms in the heteroalkyl chain and additionally one or more heteroatoms in the backbone of the chain.

The term "aromatic" refers to a ring or ring system having a conjugated pi electron system and includes both carbocyclic aromatic (e.g., phenyl) and heterocyclic aromatic groups (e.g., pyridine). The term includes monocyclic or fused-ring polycyclic (i.e., rings which share adjacent pairs of atoms) groups provided that the entire ring system is aromatic.

As used herein, "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms, although the present definition also covers the occurrence of the term "aryl" where no numerical range is designated. In some embodiments, the aryl group has 6 to 10 carbon atoms. The aryl group may be designated as "$C_{6-10}$ aryl," "$C_6$ or $C_{10}$ aryl," or similar designations. Examples of aryl groups include, but are not limited to, phenyl, naphthyl, azulenyl, and anthracenyl.

As used herein, "aryloxy" and "arylthio" refers to RO— and RS—, in which R is an aryl as is defined above, such as "$C_{6-10}$ aryloxy" or "$C_{6-10}$ arylthio" and the like, including but not limited to phenyloxy.

An "aralkyl" or "arylalkyl" is an aryl group connected, as a substituent, via an alkylene group, such "$C_{7-14}$ aralkyl" and the like, including but not limited to benzyl, 2-phenylethyl, 3-phenylpropyl, and naphthylalkyl. In some cases, the alkylene group is a lower alkylene group (i.e., a $C_{1-4}$ alkylene group).

As used herein, "heteroaryl" refers to an aromatic ring or ring system (i.e., two or more fused rings that share two adjacent atoms) that contain(s) one or more heteroatoms, that is, an element other than carbon, including but not limited to, nitrogen, oxygen and sulfur, in the ring backbone. When the heteroaryl is a ring system, every ring in the system is aromatic. The heteroaryl group may have 5-18 ring members (i.e., the number of atoms making up the ring backbone, including carbon atoms and heteroatoms), although the present definition also covers the occurrence of the term "heteroaryl" where no numerical range is designated. In some embodiments, the heteroaryl group has 5 to 10 ring members or 5 to 7 ring members. The heteroaryl group may be designated as "5-7 membered heteroaryl," "5-10 membered heteroaryl," or similar designations. Examples of heteroaryl rings include, but are not limited to, furyl, thienyl, phthalazinyl, pyrrolyl, oxazolyl, thiazolyl, imidazolyl, pyrazolyl, isoxazolyl, isothiazolyl, triazolyl, thiadiazolyl, pyridinyl, pyridazinyl, pyrimidinyl, pyrazinyl, triazinyl, quinolinyl, isoquinlinyl, benzimidazolyl, benzoxazolyl, benzothiazolyl, indolyl, isoindolyl, and benzothienyl.

A "heteroaralkyl" or "heteroarylalkyl" is heteroaryl group connected, as a substituent, via an alkylene group. Examples include but are not limited to 2-thienylmethyl, 3-thienylmethyl, furylmethyl, thienylethyl, pyrrolylalkyl, pyridylalkyl, isoxazollylalkyl, and imidazolylalkyl. In some cases, the alkylene group is a lower alkylene group (i.e., a $C_{1-4}$ alkylene group).

As used herein, "carbocyclyl" means a non-aromatic cyclic ring or ring system containing only carbon atoms in the ring system backbone. When the carbocyclyl is a ring system, two or more rings may be joined together in a fused, bridged or spiro-connected fashion. Carbocyclyls may have any degree of saturation provided that at least one ring in a ring system is not aromatic. Thus, carbocyclyls include cycloalkyls, cycloalkenyls, and cycloalkynyls. The carbocyclyl group may have 3 to 20 carbon atoms, although the present definition also covers the occurrence of the term "carbocyclyl" where no numerical range is designated. The carbocyclyl group may also be a medium size carbocyclyl having 3 to 10 carbon atoms. The carbocyclyl group could also be a carbocyclyl having 3 to 6 carbon atoms. The carbocyclyl group may be designated as "$C_{3-6}$ carbocyclyl" or similar designations. Examples of carbocyclyl rings include, but are not limited to, cyclopropyl, cyclobutyl, cyclopentyl, cyclohexyl, cyclohexenyl, 2,3-dihydro-indene, bicycle[2.2.2]octanyl, adamantyl, and spiro[4.4]nonanyl.

A "(carbocyclyl)alkyl" is a carbocyclyl group connected, as a substituent, via an alkylene group, such as "$C_{4-10}$ (carbocyclyl)alkyl" and the like, including but not limited to, cyclopropylmethyl, cyclobutylmethyl, cyclopropylethyl, cyclopropylbutyl, cyclobutylethyl, cyclopropylisopropyl, cyclopentylmethyl, cyclopentylethyl, cyclohexylmethyl, cyclohexylethyl, cycloheptylmethyl, and the like. In some cases, the alkylene group is a lower alkylene group.

As used herein, "cycloalkyl" means a fully saturated carbocyclyl ring or ring system. Examples include cyclopropyl, cyclobutyl, cyclopentyl, and cyclohexyl.

As used herein, "cycloalkenyl" means a carbocyclyl ring or ring system having at least one double bond, wherein no ring in the ring system is aromatic. An example is cyclohexenyl.

As used herein, "heterocyclyl" means a non-aromatic cyclic ring or ring system containing at least one heteroatom in the ring backbone. Heterocyclyls may be joined together in a fused, bridged or spiro-connected fashion. Heterocyclyls may have any degree of saturation provided that at least one ring in the ring system is not aromatic. The heteroatom(s) may be present in either a non-aromatic or aromatic ring in the ring system. The heterocyclyl group may have 3 to 20 ring members (i.e., the number of atoms making up the ring backbone, including carbon atoms and heteroatoms), although the present definition also covers the occurrence of the term "heterocyclyl" where no numerical range is designated. The heterocyclyl group may also be a medium size heterocyclyl having 3 to 10 ring members. The heterocyclyl group could also be a heterocyclyl having 3 to 6 ring members. The heterocyclyl group may be designated as "3-6 membered heterocyclyl" or similar designations. In preferred six membered monocyclic heterocyclyls, the heteroatom(s) are selected from one up to three of O, N or S, and in preferred five membered monocyclic heterocyclyls, the heteroatom(s) are selected from one or two heteroatoms selected from O, N, or S. Examples of heterocyclyl rings include, but are not limited to, azepinyl, acridinyl, carbazolyl, cinnolinyl, dioxolanyl, imidazolinyl, imidazolidinyl, morpholinyl, oxiranyl, oxepanyl, thiepanyl, piperidinyl, piperazinyl, dioxopiperazinyl, pyrrolidinyl, pyrrolidonyl, pyrrolidionyl, 4-piperidonyl, pyrazolinyl, pyrazolidinyl, 1,3-dioxinyl, 1,3-dioxanyl, 1,4-dioxinyl, 1,4-dioxanyl, 1,3-oxathianyl, 1,4-oxathiinyl, 1,4-oxathianyl, 2H-1,2-oxazinyl, trioxanyl, hexahydro-1,3,5-triazinyl, 1,3-dioxolyl, 1,3-dioxolanyl, 1,3-dithiolyl, 1,3-dithiolanyl, isoxazolinyl, isoxazolidinyl, oxazolinyl, oxazolidinyl, oxazolidinonyl, thiazolinyl, thiazolidinyl, 1,3-oxathiolanyl, indolinyl, isoindolinyl, tetrahydrofuranyl, tetrahydropyranyl, tetrahydrothiophenyl, tetrahydrothiopyranyl, tetrahydro-1,4-thiazinyl, thiamorpholinyl, dihydrobenzofuranyl, benzimidazolidinyl, and tetrahydroquinoline.

A "(heterocyclyl)alkyl" is a heterocyclyl group connected, as a substituent, via an alkylene group. Examples include, but are not limited to, imidazolinylmethyl and indolinylethyl.

As used herein, "acyl" refers to —C(=O)R, wherein R is hydrogen, $C_{1-6}$ alkyl, $C_{2-6}$ alkenyl, $C_{2-6}$ alkynyl, $C_{3-7}$ carbocyclyl, aryl, 5-10 membered heteroaryl, and 5-10 membered heterocyclyl, as defined herein. Non-limiting examples include formyl, acetyl, propanoyl, benzoyl, and acryl.

An "O-carboxy" group refers to a "—OC(=O)R" group in which R is selected from hydrogen, $C_{1-6}$ alkyl, $C_{2-6}$ alkenyl, $C_{2-6}$ alkynyl, $C_{3-7}$ carbocyclyl, aryl, 5-10 membered heteroaryl, and 5-10 membered heterocyclyl, as defined herein.

A "C-carboxy" group refers to a "—C(=O)OR" group in which R is selected from hydrogen, $C_{1-6}$ alkyl, $C_{2-6}$ alkenyl, $C_{2-6}$ alkynyl, $C_{3-7}$ carbocyclyl, aryl, 5-10 membered heteroaryl, and 5-10 membered heterocyclyl, as defined herein. A non-limiting example includes carboxyl (i.e., —C(=O)OH).

A "cyano" group refers to a "—CN" group.

A "cyanato" group refers to an "—OCN" group.

An "isocyanato" group refers to a "—NCO" group.

A "thiocyanato" group refers to a "—SCN" group.

An "isothiocyanato" group refers to an "—NCS" group.

A "sulfinyl" group refers to an "—S(=O)R" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

A "sulfonyl" group refers to an "—$SO_2$R" group in which R is selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "S-sulfonamido" group refers to a "—$SO_2NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-sulfonamido" group refers to a "—$N(R_A)SO_2R_B$" group in which $R_A$ and $R_b$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "O-carbamyl" group refers to a "—OC(=O)$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-carbamyl" group refers to an "—$N(R_A)OC(=O)R_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "O-thiocarbamyl" group refers to a "—OC(=S)$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-thiocarbamyl" group refers to an "—$N(R_A)OC(=S)R_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

A "C-amido" group refers to a "—C(=O)$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "N-amido" group refers to a "—N($R_A$)C(=O)$R_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "amino" group refers to a "—N$R_A R_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein.

An "aminoalkyl" group refers to an amino group connected via an alkylene group.

An "alkoxyalkyl" group refers to an alkoxy group connected via an alkylene group, such as a "$C_{2-8}$ alkoxyalkyl" and the like.

As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_6$ alkyl, $C_1$-$C_6$ alkenyl, $C_1$-$C_6$ alkynyl, $C_1$-$C_6$ heteroalkyl, $C_3$-$C_7$ carbocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), $C_3$-$C_7$-carbocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl($C_1$-$C_6$)alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl($C_1$-$C_6$)alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), halo, cyano, hydroxy, $C_1$-$C_6$ alkoxy, $C_1$-$C_6$ alkoxy($C_1$-$C_6$)alkyl (i.e., ether), aryloxy, sulfhydryl (mercapto), halo($C_1$-$C_6$) alkyl (e.g., —$CF_3$), halo($C_1$-$C_6$)alkoxy (e.g., —$OCF_3$), $C_1$-$C_6$ alkylthio, arylthio, amino, amino($C_1$-$C_6$)alkyl, nitro, O-carbamyl, N-carbamyl, O-thiocarbamyl, N-thiocarbamyl, C-amido, N-amido, S-sulfonamido, N-sulfonamido, C-carboxy, O-carboxy, acyl, cyanato, isocyanato, thiocyanato, isothiocyanato, sulfinyl, sulfonyl, and oxo (=O). Wherever a group is described as "optionally substituted" that group can be substituted with the above substituents.

In some embodiments, substituted group(s) is (are) substituted with one or more substituent(s) individually and independently selected from $C_1$-$C_4$ alkyl, amino, hydroxy, and halogen.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as —$CH_2$—, —$CH_2CH_2$—, —$CH_2CH(CH_3)CH_2$—, and the like. Other radical naming conventions clearly indicate that the radical is a di-radical such as "alkylene" or "alkenylene."

As used herein, "alkylene" means a branched, or straight chain fully saturated di-radical chemical group containing only carbon and hydrogen that is attached to the rest of the molecule via two points of attachment (i.e., an alkanediyl). The alkylene group may have 1 to 20 carbon atoms, although the present definition also covers the occurrence of the term alkylene where no numerical range is designated. The alkylene group may also be a medium size alkylene having 1 to 9 carbon atoms. The alkylene group could also be a lower alkylene having 1 to 4 carbon atoms. The alkylene group may be designated as "$C_{1-4}$ alkylene" or similar designations. By way of example only, "$C_{1-4}$ alkylene" indicates that there are one to four carbon atoms in the alkylene chain, i.e., the alkylene chain is selected from the group consisting of methylene, ethylene, ethan-1,1-diyl, propylene, propan-1,1-diyl, propan-2,2-diyl, 1-methyl-ethylene, butylene, butan-1,1-diyl, butan-2,2-diyl, 2-methyl-propan-1,1-diyl, 1-methyl-propylene, 2-methyl-propylene, 1,1-dimethyl-ethylene, 1,2-dimethyl-ethylene, and 1-ethyl-ethylene.

As used herein, "alkenylene" means a straight or branched chain di-radical chemical group containing only carbon and hydrogen and containing at least one carbon-carbon double bond that is attached to the rest of the molecule via two points of attachment. The alkenylene group may have 2 to 20 carbon atoms, although the present definition also covers the occurrence of the term alkenylene where no numerical range is designated. The alkenylene group may also be a medium size alkenylene having 2 to 9 carbon atoms. The alkenylene group could also be a lower alkenylene having 2 to 4 carbon atoms. The alkenylene group may be designated as "$C_{2-4}$ alkenylene" or similar designations. By way of example only, "$C_{2-4}$ alkenylene" indicates that there are two to four carbon atoms in the alkenylene chain, i.e., the alkenylene chain is selected from the group consisting of ethenylene, ethen-1,1-diyl, propenylene, propen-1,1-diyl, prop-2-en-1,1-diyl, 1-methyl-ethenylene, but-1-enylene, but-2-enylene, but-1,3-dienylene, buten-1,1-diyl, but-1,3-dien-1,1-diyl, but-2-en-1,1-diyl, but-3-en-1,1-diyl, 1-methyl-prop-2-en-1,1-diyl, 2-methyl-prop-2-en-1,1-diyl, 1-ethyl-ethenylene, 1,2-dimethyl-ethenylene, 1-methyl-propenylene, 2-methyl-propenylene, 3-methyl-propenylene, 2-methyl-propen-1,1-diyl, and 2,2-dimethyl-ethen-1,1-diyl.

The compounds described herein, including but not limited to the compounds of formula (Ia), (Ib), (IIa), (IIb), (III), (IVa), (IVb), (Va), (Vb), (VI), the first reaction intermediate, or the second reaction intermediate, should be understood to also include the ionic form of the compound when in solution.

Salts described herein include but are not limited to salts of such compound with an organic or inorganic acid or with an organic or inorganic base. In many cases, the compounds herein are capable of forming acid and/or base salts by virtue of the presence of amino and/or carboxyl groups or groups similar thereto. Acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Base addition salts can be formed with inorganic and organic bases. Inorganic bases from which salts can be derived include, for example, sodium, potassium, lithium, ammonium, calcium, magnesium, iron, zinc, copper, manganese, aluminum, and the like; particularly preferred are the ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in WO 87/05297, Johnston et al., published Sep. 11, 1987 (incorporated by reference herein in its entirety).

Continuous Production Process

One aspect of the present technology relates to a process for production of a compound of Formula (Ia) or (Ib) or salt thereof,

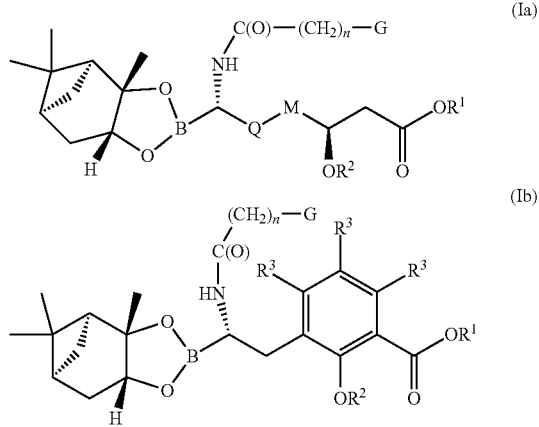

the process comprising:
providing a first continuous flow of a lithium amide;
providing a continuous flow of a compound of Formula (IIa) or (IIb) or salt thereof;

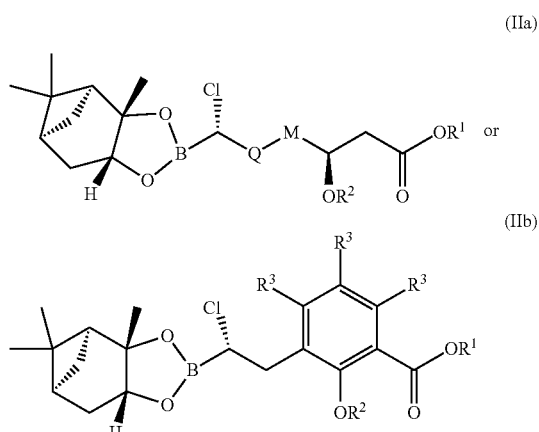

combining the first continuous flow of the lithium amide and the continuous flow of the compound of Formula (IIa) or (IIb) or salt thereof at a first continuous flow conduit at a first temperature to yield a first reaction intermediate;
transitioning the first reaction intermediate to a second temperature to yield a second reaction intermediate; and
combining the second reaction intermediate and a compound of Formula (III) or salt thereof downstream of the second continuous flow conduit to yield the compound of Formula (Ia) or (Ib) or salt thereof $$A\text{-}O\text{---}C(O)\text{---}(CH_2)_nG \qquad (III).$$

In some embodiments, transitioning the first reaction intermediate to a second temperature to yield a second reaction intermediate comprises delivering the first reaction intermediate to a second continuous flow conduit at the second temperature to yield the second reaction intermediate.

In some embodiments, the second reaction intermediate is collected in a vessel wherein the vessel does not have a continuous outflow. In some embodiments, the second reaction intermediate is collected in a vessel wherein the vessel is a continuous outflow or includes at least one continuous flow.

In some embodiments, the lithium amide solution can be a continuous flow of the lithium amide in one or more suitable organic solvents. In some embodiments, the first continuous flow of the lithium amide is a continuous flow of the lithium amide in tetrahydrofuran, heptane, hexane, cyclohexane, toluene, or any combinations thereof. In some embodiments, the first continuous flow of the lithium amide is a continuous flow of the lithium amide in tetrahydrofuran.

In some embodiments, the providing a first continuous flow of a lithium amide further comprises
providing a continuous flow of tetrahydrofuran;
providing a second continuous flow of the lithium amide; and
combining the continuous flow of tetrahydrofuran and the second continuous flow of the lithium amide before the first continuous flow conduit to form the first continuous flow of the lithium amide.

The second continuous flow of the lithium amide can be in one or more suitable solvents. In some embodiments, the second continuous flow of the lithium amide is in tetrahydrofuran.

In some embodiments, a lithium amide can be a dipolar compound represented by the general formula RR'NLi or $LiN(SiR_3)(SiR'_3)$, wherein R and R' are each independently selected from, optionally substituted $C_{1\text{-}10}$ alkyl, optionally substituted $C_{2\text{-}10}$alkenyl, optionally substituted $C_{2\text{-}10}$alkynyl, optionally substituted $C_{3\text{-}7}$ carbocyclyl, optionally substituted 4-10 membered heterocyclyl, optionally substituted $C_{6\text{-}10}$aryl, optionally substituted 5-10 membered heteroaryl, optionally substituted $C_{1\text{-}6}$alkylene-$C_{3\text{-}7}$carbocyclyl, optionally substituted $C_{1\text{-}6}$alkylene-5-10 membered heterocyclyl, optionally substituted $C_{1\text{-}6}$alkylene-$C_{6\text{-}10}$aryl, or optionally substituted $C_{1\text{-}6}$alkylene-5-10 membered heteroaryl. In some embodiments, the lithium amide is lithium bis(trimethylsilyl)amide. In some embodiments, the lithium amide is lithium diisopropylamide, lithium diethylamide, lithium pyrrolidide, lithium piperidide, or lithium 2,2,6,6,-tetramethylpiperidide.

The continuous flow of the compound of Formula (IIa) or (IIb) can be a continuous flow of the compound of Formula (IIa) or (IIb) in one or more suitable organic solvents. In some embodiments, the continuous flow of the compound of Formula (IIa) or (IIb) is a continuous flow of the compound of Formula (IIa) or (IIb) in tetrahydrofuran. In some embodiments, the continuous flow of the compound of Formula (IIa) or (IIb) is a continuous flow of the compound of Formula (IIa) or (IIb) in heptane. In some embodiments, the continuous flow of the compound of Formula (IIa) or (IIb)

is a continuous flow of the compound of Formula (IIa) or (IIb) in heptane and tetrahydrofuran.

In some embodiments, a solution of the compound of Formula (IIa) or (IIb) stored in a vessel may be combined with additional organic solvent (e.g., tetrahydrofuran) to reach a more preferred concentration before the solution flows out of the vessel. In some embodiments, a solution of the compound of Formula (IIa) or (IIb) flowing out of the vessel can have a concentration of about 20% to 60% by weight of the compound of Formula (IIa) or (IIb). In some embodiments, a solution of the compound of Formula (IIa) or (IIb) flowing out of the vessel can have a concentration of about 25% to 55% by weight of the compound of Formula (IIa) or (IIb). In some embodiments, a solution of the compound of Formula (IIa) or (IIb) flowing out of the vessel can have a concentration of about 25% to 35% by weight of the compound of Formula (IIa) or (IIb).

The vessel storing a solution of the compound of Formula (IIa) or (IIb) can be pressurized to generate a preferred flow rate for the compound of Formula (IIa) or (IIb). In some embodiments, the flow rate of the compound of Formula (IIa) or (IIb) is in the range of about 0.17 kg/h to about 0.23 kg/h. In some embodiments, the flow rate is in the range of about 0.1 kg/h to about 0.4 kg/h. In some embodiments, the flow rate is in the range of about 0.15 kg/h to about 0.25 kg/h. In some embodiments, the flow rate is about 0.19 kg/h.

In some embodiments, the first reaction intermediate comprises a compound having the structure of formula (IVa) or (IVb) or salt thereof

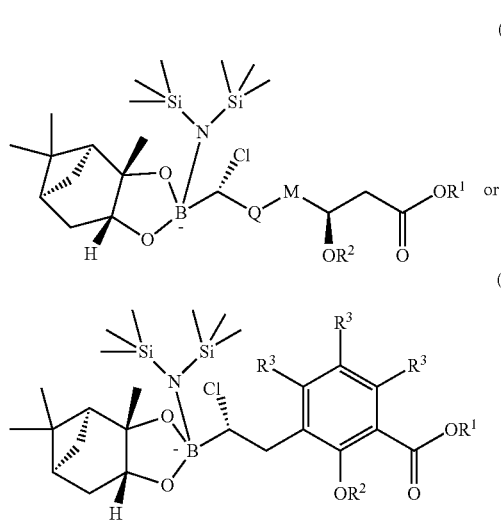

In some embodiments, the first reaction intermediate comprises a compound having the structure of formula (IVa). In some embodiments, the first reaction intermediate comprises

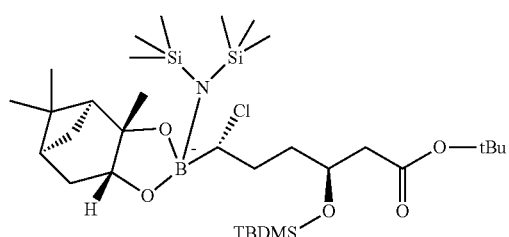

or salt thereof.

In some embodiments, the second reaction intermediate comprises a compound having the structure of formula (Va) or (Vb) or salt thereof

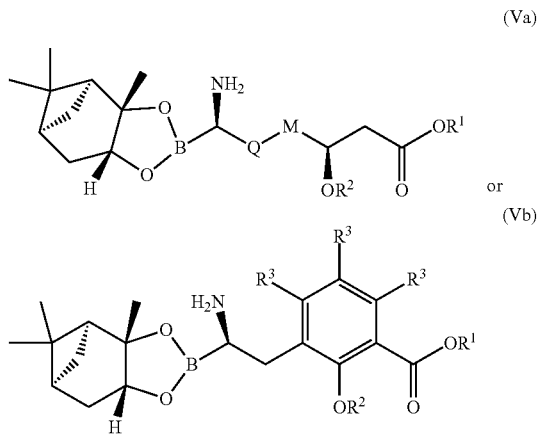

In some embodiments, the second reaction intermediate comprises a compound having the structure of formula (Va). In some embodiments, the second reaction intermediate comprises

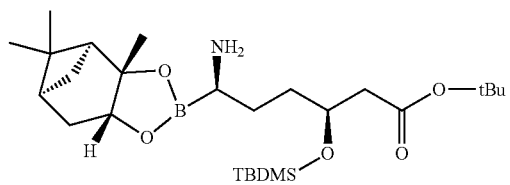

or salt thereof.

The process described herein can further include preparing the reagents or solvents used in the process under an inert atmosphere. In some embodiments, the process described herein can further include preparing the lithium amide, the compound of formula (IIa) or (IIb), and the tetrahydrofuran under a nitrogen or argon atmosphere. In some embodiments, the process can include preparing the compound of formula (III) under an inert atmosphere.

The reagents and solvents used in this process can be substantially free of water. In some embodiments, the lithium amide, the compound of formula (IIa) or (IIb), the trimethylsilyl chloride, and the tetrahydrofuran used in the process are substantially free of water.

The process described herein can further include combining trimethylsilyl chloride to the compound of formula (IIa) or (IIb) prior to providing a continuous flow of a compound of formula (IIa) or (IIb). In some embodiments, the continuous flow of the compound of formula (IIa) or (IIb) include trimethylsilyl chloride. In some embodiments, the continuous flow of the compound of formula (IIa) or (IIb) does not include trimethylsilyl chloride.

The process described herein can further include preparing a compound of formula (III) in a vessel downstream of the second continuous flow conduit. In some embodiments, preparing the compound of formula (III) includes combining a compound of formula (VI) G-$(CH_2)_n$—COOH (VI), 1-(3-Dimethylaminopropyl)-3-ethylcarbodiimide hydrochloride (EDCl), and Hydroxybenzotriazole (HOBt) in a vessel. In some embodiments, preparing the compound of formula (III) is performed at a temperature in the range of about −10° C. to 10° C. In some embodiments, preparing the compound of formula (III) is performed at 0° C.

The process can further include pre-cooling the lithium amide to a temperature in the range of about −50° C. to about 0° C. The pre-cooling process can include one or more stages of gradually lowering the temperature. For example, the pre-cooling described herein can include a first stage of lowering the temperature and a second stage of further lowering the temperature. In some embodiments, the process described herein can include pre-cooling the lithium amide to a temperature of about −90° C., −80° C., −75° C., −70° C., −65° C., −60° C., −50° C., −40° C., −30° C., −25° C., −10° C., or −5° C. prior to delivering the lithium amide to the first continuous flow conduit. In some embodiments, the process described herein can further include a first stage of pre-cooling the lithium amide to a temperature in the range of about −100° C. to 0° C., −90° C. to −10° C., −80° C. to −10° C., −80° C. to −20° C., −70° C. to −20° C., −70° C. to −10° C., −60° C. to −20° C., −60° C. to −10° C., −50° C. to −20° C., −50° C. to −10° C., −40° C. to −20° C., −40° C. to −10° C., −30° C. to 0° C., −20° C. to 0° C., or −15° C. to 0° C. prior to the combining of the first continuous flow of the lithium amide and the continuous flow of tetrahydrofuran. In some embodiments, the process described herein can further include a first stage of pre-cooling the lithium amide to a temperature in the range of about −30° C. to 0° C. prior to the combining of the first continuous flow of the lithium amide and the continuous flow of tetrahydrofuran.

In an embodiment wherein a continuous flow of tetrahydrofuran is provided separately from the lithium amide solution, the process described herein can further comprise pre-cooling the tetrahydrofuran. In some embodiments, the tetrahydrofuran can be pre-cooled to a temperature in the range of about −80° C. to −20° C. prior to being combined with the separate continuous flow of the lithium amide. In some embodiments, the tetrahydrofuran can be pre-cooled to a temperature in the range of about −80° C. to −65° C. prior to being combined with the separate continuous flow of the lithium amide. In some embodiments, the tetrahydrofuran can be pre-cooled to a temperature of about −80° C., −75° C., −70° C., −65° C., or −60° C. prior to the being combined with the continuous flow of tetrahydrofuran and the second continuous flow of the lithium amide. In some embodiments, the tetrahydrofuran can be pre-cooled to a temperature of in the range of about −100° C. to −0° C., −90° C. to −10° C., −80° C. to −10° C., −80° C. to −20° C., −70° C. to −20° C., −70° C. to −10° C., −60° C. to −20° C., −60° C. to −10° C., −50° C. to −20° C., −50° C. to −10° C., −40° C. to −20° C., or −40° C. to −10° C. prior to the being combined with the continuous flow of tetrahydrofuran and the second continuous flow of the lithium amide.

In such an embodiment, the process described herein can further comprise pre-cooling the separate continuous flow of the lithium amide. In such an embodiment, the separate continuous flow of the lithium amide can be pre-cooled to a temperature in the range of about −80° C. to −10° C. prior to being combined with the continuous flow of tetrahydrofuran. In some embodiments, the separate continuous flow of the lithium amide can be pre-cooled to a temperature in the range of about −80° C. to −10° C. prior to being combined with the continuous flow of tetrahydrofuran. In some embodiments, the separate continuous flow of the lithium amide can be pre-cooled to a temperature of about −80° C., −75° C., −70° C., −60° C., 60° C., −55° C., −50° C., −40° C., −30° C., −20° C., −10° C., or −5° C. prior to being combined with the continuous flow of tetrahydrofuran. In some embodiments, the separate continuous flow of the lithium amide can be pre-cooled to a temperature in the range of about −100° C. to −0° C., −90° C. to −10° C., −80° C. to −10° C., −80° C. to −20° C., −70° C. to −20° C., −70° C. to −10° C., −60° C. to −20° C., −60° C. to −10° C., −50° C. to −20° C., −50° C. to −10° C., −40° C. to −20° C., or −40° C. to −10° C. prior to being combined with the continuous flow of tetrahydrofuran.

The process can further include pre-cooling the tetrahydrofuran to a temperature in the range of about −100° C. to about 0° C. prior to the combining of the first continuous flow of the lithium amide and the continuous flow of tetrahydrofuran. In some embodiments, the process described herein can further include pre-cooling the tetrahydrofuran to a temperature of about −90° C., −80° C., −75° C., −70° C., −65° C., −60° C., −55° C., −50° C., −40° C., −30° C., −20° C., −10° C., or −5° C. prior to the combining of the first continuous flow of the lithium amide and continuous flow of tetrahydrofuran. In some embodiments, the process described herein can further include pre-cooling the tetrahydrofuran to a temperature in the range of about −100° C. to −0° C., −90° C. to −10° C., −80° C. to −10° C., −80° C. to −20° C., −70° C. to −20° C., −70° C. to −10° C., −60° C. to −20° C., −60° C. to −10° C., −50° C. to −20° C., −50° C. to −10° C., −40° C. to −20° C., or −40° C. to −10° C. prior to the combining of the first continuous flow of the lithium amide and the continuous flow of tetrahydrofuran. In some embodiments, the process described herein can further include pre-cooling the tetrahydrofuran to about −30° C. prior to the combining of the first continuous flow of the lithium amide and the continuous flow of tetrahydrofuran.

The process can further include pre-cooling the compound of Formula (IIa) or (IIb) to a temperature suitable for the lithium amide addition reaction. In some embodiments, the process described herein can further include pre-cooling the compound of Formula (IIa) or (IIb) to a temperature in the range of about −100° C. to about 0° C. prior to the combining of the continuous flow of the lithium amide and the continuous flow of the compound of Formula (IIa) or (IIb). In some embodiments, the process described herein can further include pre-cooling the compound of Formula (IIa) or (IIb) to a temperature of about −90° C., −80° C., −75° C., −70° C., −65° C., −60° C., −55° C., −50° C., −40° C., −30° C., −20° C., −10° C., or −5° prior to the combining of the continuous flow of the lithium amide and the continuous flow of the compound of Formula (IIa) or (IIb). In some embodiments, the process described herein can further include pre-cooling the compound of Formula (IIa) or (IIb) to a temperature of about −30° C. prior to the combining of the continuous flow of the lithium amide and the continuous flow of the compound of Formula (IIa) or (IIb). In some embodiments, the process described herein can further include pre-cooling the compound of Formula (IIa) or (IIb) to a temperature in the range of about −50° C. to 0° C. or −30° C. to 0° C. prior to the combining of the continuous flow of the first reaction intermediate and the continuous flow of the compound of Formula (IIa) or (IIb). In some embodiments, the process described herein can further include pre-cooling the compound of Formula (IIa) or (IIb) to a temperature in the range of about −100° C. to 0° C., −90° C. to −10° C., −80° C. to −10° C., −80° C. to −20° C., −70° C. to −20° C., −70° C. to −10° C., −60° C. to −20° C., −60° C. to −10° C., −50° C. to −20° C., −50° C. to −10° C., −40° C. to −20° C., −40° C. to −10° C., −30° C. to 0° C., −20° C. to 0° C., or −15° C. to 0° C. prior to the combining of the continuous flow of the first reaction intermediate and the continuous flow of the compound of Formula (IIa) or (IIb).

The process described herein can further include maintaining the first continuous flow conduit at a temperature in the range of about −100° C. to about 0° C. during the process. In some embodiments, the process described herein can further include maintaining the first continuous flow conduit at a temperature of about −85° C., −80° C., −75° C., −70° C., −65° C., 60° C., −55° C., −50° C., −40° C., −30° C., −20° C., −10° C., or −5° C. In some embodiments, the process described herein can further include maintaining the first continuous flow conduit at a temperature of about −50° C., −40° C., −30° C., −20° C., or −10° C. In some embodiments, the process described herein can further include maintaining the first continuous flow conduit at a temperature of about −30°. In some embodiments, the process described herein can further include maintaining the first continuous flow conduit at a temperature of about −35° C. In some embodiments, the process described herein can further include maintaining the first continuous flow conduit at a temperature of in the range of about −100° C. to −0° C., −90° C. to −10° C., −80° C. to −10° C., −80° C. to −20° C., −70° C. to −20° C., −70° C. to −10° C., −60° C. to −20° C., −60° C. to −10° C., −50° C. to −30° C., −50° C. to −20° C., −50° C. to −10° C., −40° C. to −20° C., −40° C. to −10° C., or −40° C. to −30° C.

The process described herein can further include maintaining the second continuous flow conduit at a temperature in the range of about −30° C. to about 40° C., about −20° C. to about 30° C., about 0° C. to about 45° C., or about 0° C. to about 25° C. In some embodiments, the process described herein can further include maintaining the second continuous flow conduit at a temperature of about −30° C., −20° C., −10° C., 0° C., 5° C., 10° C., 15° C., 20° C., 25° C., 30° C., or 40° C. In some embodiments, the process described herein can further include maintaining the second continuous flow conduit at a temperature of about −10° C., 0° C., 5° C., 10° C., 15° C., 20° C., 25° C. In some embodiments, the process described herein can further include maintaining the second continuous flow conduit at a temperature of about 25° C. In some embodiments, the process described herein can further include maintaining the second continuous flow conduit at a temperature no greater than 40° C. In some embodiments, the process described herein can further include maintaining the second continuous flow conduit at a room temperature. In some embodiments, the process described herein can further include maintaining the second continuous flow conduit at a temperature in the range of about −40° C. to 40° C., −30° C. to 30° C., −20° C. to 40° C., −20° C. to 35° C., −20° C. to 30° C., −20° C. to 25° C., −20° C. to 20° C., −10° C. to 40° C., −10° C. to 35° C., −10° C. to 30° C., −10° C. to 25° C., −5° C. to 40° C., −5° C. to 35° C., −5° C. to 30° C., −5° C. to 25° C., −5° C. to 20° C., −5° C. to 15° C., 0° C. to 40° C., 0° C. to 35° C., 0° C. to 30° C., 0° C. to 25° C., 0° C. to 20° C., 0° C. to 15° C., 5° C. to 40° C., 5° C. to 35° C., 5° C. to 30° C., 5° C. to 25° C., 5° C. to 20° C., 5° C. to 15° C., 10° C. to 40° C., 10° C. to 35° C., 10° C. to 30° C., 10° C. to 25° C., 10° C. to 20° C., or 10° C. to 15° C.

The process described herein can further include maintaining the vessel that is downstream of the second continuous flow conduit at a temperature in the range of about −30° C. to about 30° C., about −20° C. to about 20° C., about −10° C. to about 20° C., about −5° C. to about 20° C., about −10° C. to about 10° C., about −5° C. to about 5° C., or about 0° C. to about 5° C. In some embodiments, the process described herein can further include maintaining the vessel that is downstream of the second continuous flow conduit at a temperature of about −5° C. to about 10° C. In some embodiments, the process described herein can further include maintaining the vessel that is downstream of the second continuous flow conduit at a temperature of about −30° C., −20° C., −10° C., −5° C., 0° C., 5° C., 10° C., 15° C., 20° C., 25° C., 30° C., or 40° C. In some embodiments, the process described herein can further include maintaining the vessel that is downstream of the second continuous flow conduit at a temperature of 0° C. In some embodiments, the process described herein can further include maintaining the vessel that is downstream of the second continuous flow conduit at a temperature of about −40° C. to 40° C., −30° C. to 30° C., −20° C. to 40° C., −20° C. to 35° C., −20° C. to 30° C., −20° C. to 25° C., −20° C. to 20° C., −20° C. to 15° C., −20° C. to 5° C., −20° C. to 0° C., −20° C. to −10° C., −10° C. to 40° C., −10° C. to 35° C., −10° C. to 30° C., −10° C. to 25° C., −10° C. to 20° C., −10° C. to 15° C., −10° C. to 5° C., −10° C. to 0° C., −10° C. to −5° C., −5° C. to 40° C., −5° C. to 35° C., −5° C. to 30° C., −5° C. to 25° C., −5° C. to 20° C., −5° C. to 15° C., −5° C. to 5° C., or −5° C. to 0° C. When the vessel is maintained at the selected temperature or temperature range described above, the reaction mixture in the vessel can be stirred for at least about 5 min, 20 min, 0.5 h, 1 h, 2 h, 3 h, 5 h, or 12 h. In some embodiments, the reaction mixture in the vessel can be kept stirring at the selected temperature or temperature range for about 5 min-1 h, 5 min-3 h, or 5 min-12 h.

In some embodiments, in addition to the step of maintaining the vessel that is downstream of the second continuous flow conduit at a low temperature (e.g, about −30° C. to about 30° C., about −20° C. to about 20° C., about −10° C. to about 20° C., about −5° C. to about 20° C., about −10° C. to about 10° C., about −5° C. to about 5° C., or about 0° C. to about 5° C.), the process described herein also includes a step of warning up the vessel to a room temperature (e.g., 18° C. to 30° C. or 18° C. to 24° C.) and stirring the reaction mixture in the vessel for at least about 5 min, 20 min, 0.5 h, 1 h, 3 h, 5 h, or 12 h.

The flow time in the continuous flow conduit can vary depending on the flow rate and the length of the continuous flow conduit. In some embodiments, a flow time from in the first continuous flow conduit is about 20 s-200 s, about 40 s-about 120 s, about 50 s-100 s, or about 60 s-80 s. In some embodiments, a flow time in the first continuous flow conduit is about 20 s, 30 s, 40 s, 50 s, 60 s, 70 s, 72 s, 75 s, 80 s, 90 s, 100 s, 110 s, 120 s, 130 s, 140 s, 150 s, 160 s, 170 s, 180 s, 190 s, or 200 s. In some embodiments, a flow time in the first continuous flow conduit is about 72 seconds. In some embodiments, a flow time in the first continuous flow conduit is in the range of about 10 s-200 s, 20 s-180 s, 20 s-160 s, 20 s-150 s, 20 s-120 s, 20 s-100 s, 20 s-80 s, 30 s-200 s, 30 s-180 s, 30 s-150 s, 30 s-120 s, 30 s-100 s, 30 s-80 s, 40 s-200 s, 40 s-180 s, 40 s-160 s, 40 s-150 s, 40 s-120 s, 40 s-100 s, 40 s-80 s, 50 s-200 s, 50 s-180 s, 50 s-160 s, 50 s-150 s, 50 s-120 s, 50 s-100 s, 50 s-80 s, 60 s-200 s, 60 s-180 s, 60 s-160 s, 60 s-150 s, 60 s-120 s, 60 s-100 s, 60 s-80 s, 70 s-200 s, 70 s-180 s, 70 s-150 s, 70 s-120 s, 70 s-100 s, 70 s-80 s, or 80 s-100 s.

In some embodiments, a flow time in the second continuous flow conduit is about 5 min to about 30 min, about 10 min to about 25 min, about 12 min to about 20 min, or about 14 min to about 15 min. In some embodiments, a flow time in the second continuous flow conduit is about 5, 6, 7, 8, 9, 10, 11, 12, 13, 14, 15, 16, 17, 18, 19, 20, 21, 22, 23, 24, 25, 26, 27, 28, 29, or 30 min. In some embodiments, a flow time in the second continuous flow conduit is about 14 min. In some embodiments, a flow time in the second continuous flow conduit is about 15 min. In some embodiments, a flow time in the second continuous flow conduit is in the range of about 1 min-50 min, 1 min-40 min, 1 min-30 min, 1 min-25 min, 1 min-20 min, 1 min-18 min, 1 min-15 min, 3 min-50 min, 3 min-40 min, 3 min-30 min, 3 min-25 min, 3 min-20 min, 3 min-18 min, 3 min-15 min, 5 min-50 min, 5 min-40 min, 5 min-30 min, 5 min-25 min, 5 min-20 min, 5 min-18 min, 5 min-15 min, 5 min-10 min, 8 min-50 min, 8 min-40 min, 8 min-30 min, 8 min-25 min, 8 min-20 min, 8 min-18 min, 8 min-15 min, 8 min-10 min, 10 min-50 min, 10 min-40 min, 10 min-30 min, 10 min-25 min, 10 min-20 min, 10 min-18 min, 10 min-15 min, or 10 min-12 min.

In some embodiments, the reaction mixture of the second reaction intermediate and the compound of Formula (III), which are combined downstream of the second continuous flow conduit, are suspended in a vessel and stirred for about 0.5 h-7 h, 1 h-6 h, or about 2 h-5 h. In some embodiments, the mixture of the second reaction intermediate and the compound of Formula (III) are suspended in a vessel and stirred for about 2 h-5 h.

In some embodiments where lithium amide is in a solvent (e.g., tetrahydrofuran), the concentration of the lithium amide prior to flowing into the first continuous flow conduit can be about 10%, 15%, 20%, 25%, 30%, 35%, or 40%. In some embodiments, the concentration of the lithium amide prior to flowing into the first continuous flow conduit is about 25%. In some embodiments, the concentration of the lithium amide prior to flowing into the first continuous flow conduit is lower than 25%. In some embodiments, the concentration of the lithium amide prior to flowing into the first continuous flow conduit is in the range of about 15% to about 45%, about 15% to 30%, about 15% to about 25%, about 20% to 40%, or about 22% to about 27%. In some embodiments, the concentration of the lithium amide prior to flowing into the first continuous flow conduit is in the range of about 25% to about 50%. In some embodiments, the concentration of the lithium amide prior to flowing into the first continuous flow conduit is in the range of about 20% to about 60%. In some embodiments, the concentration of the lithium amide prior to flowing into the first continuous flow conduit is in the range of about 1%-100%, 5%-90%, 10%-80%, 10%-70%, 10%-60%, 10%-50%, 10%-40%, 10%-30%, 10%-20%, 15%-80%, 15%-70%, 15%-60%, 15%-50%, 15%-40%, 15%-30%, 15%-20%, 20%-80%, 20%-70%, 20%-60%, 20%-50%, 20%-40%, 20%-30%, or 20%-25%.

The lithium amide solution can be stored in a vessel and the vessel can be pressurized to generate a preferred flow rate for the lithium amide solution flowing out of the vessel. In some embodiments, the flow rate for the lithium amide solution is in the range of about 0.09 kg/h to about 0.13 kg/h. In some embodiments, the flow rate is in the range of about 0.05 kg/h to about 0.2 kg/h. In some embodiments, the flow rate is in the range of about 0.1 kg/h to about 0.15 kg/h.

For embodiments wherein lithium amide is combined with additional tetrahydrofuran prior to flowing into the first continuous flow conduit, the concentration of the lithium amide in tetrahydrofuran is about 10%, 15%, 20%, 25%, 30%, 35%, or 40%. In some embodiments, the concentration of the lithium amide in tetrahydrofuran is about 25%. In some embodiments, the concentration of the lithium amide in tetrahydrofuran is about 15%-30%, about 20%-40%, or about 22% to about 27%. In some embodiments, the concentration of the lithium amide in tetrahydrofuran is in the range of about 1%-80%, 1%-60%, 1%-50%, 1%-40%, 1%-30%, 1%-25%, 5%-80%, 5%-60%, 5%-50%, 5%-40%, 5%-30%, 5%-25%, 10%-80%, 10%-60%, 10%-50%, 10%-40%, 10%-30%, 10%-25%, 15%-80%, 15%-60%, 15%-50%, 15%-40%, 15%-30%, 15%-25%, 20%-80%, 20%-60%, 20%-50%, 20%-40%, 20%-30%, or 20%-25%.

In embodiments where the compound of (IIa) or (IIb) is in a solvent (e.g., tetrahydrofuran), the concentration of the compound of (IIa) or (IIb) prior to flowing into the first continuous flow conduit or in some embodiments is about 10%, 15%, 20%, 25%, 27%, 30%, 35%, 40%, 45%, 50%, 55%, 60%, 65%, or 70%. In embodiments where lithium amide is in a solvent (e.g., tetrahydrofuran), the concentration of the lithium amide prior to flowing into the first continuous flow conduit or in some embodiments is about 27%. In embodiments where lithium amide is in a solvent (e.g., tetrahydrofuran), the concentration of the lithium amide prior to flowing into the first continuous flow conduit or in some embodiments is about 45%. In some embodiments, the concentration of the lithium amide prior to flowing into the first continuous flow conduit is in the range of about 15% to about 75%, about 30% to 50%, about 25% to 50%, or about 40% to about 50%. In some embodiments, the concentration of the lithium amide prior to flowing into the first continuous flow conduit is in the range of about 1%-80%, 1%-60%, 1%-50%, 1%-40%, 1%-30%, 1%-27%, 1%-25%, 5%-80%, 5%-60%, 5%-50%, 5%-40%, 5%-27%, 5%-30%, 5%-25%, 10%-80%, 10%-60%, 10%-50%, 10%-40%, 10%-30%, 10%-27%, 10%-25%, 15%-80%, 15%-60%, 15%-50%, 15%-40%, 15%-30%, 15%-27%, 15%-25%, 20%-80%, 20%-60%, 20%-50%, 20%-40%, 20%-30%, 20%-27%, or 20%-25%.

In some embodiments, a small amount of trimethylsilyl chloride is added to the solution containing the compound of (IIa) or (IIb) prior to combining the solution with the lithium amide. In some embodiments, the molar ratio of trimethylsilyl chloride to the compound of formula (IIa) or (IIb) is about 0.01, 0.02, 0.03, 0.04, 0.05, or 0.06. In some embodiments, the molar ratio of trimethylsilyl chloride to the compound of formula (IIa) or (IIb) is about 0.03. In some embodiments, the molar ratio of trimethylsilyl chloride to the compound of formula (IIa) or (IIb) is in the range of about 0.01 to 0.1, about 0.02 to about 0.05, or about 0.02 to about 0.04. In some embodiments, the molar ratio of trimethylsilyl chloride to the compound of formula (IIa) or (IIb) is in the range of about 0.001-1, 0.001-0.5, 0.001-0.1, 0.001-0.05, 0.005-1, 0.005-0.5, 0.005-0.1, 0.005-0.05, 0.01-1, 0.01-0.5, 0.01-0.1, 0.01-0.05, 0.02-1, 0.02-0.5, 0.02-0.1, 0.02-0.04, 0.02-0.05, 0.03-1, 0.03-0.5, 0.03-0.1, or 0.03-0.05. In some embodiments, no trimethylsilyl chloride is added to the solution containing the compound of (IIa) or (IIb) prior to combining the solution with the lithium amide.

The molar ratio of the lithium amide to the compound of formula (IIa) or (IIb) can vary depending on the reaction temperature, the reaction solvent, and other reaction conditions in the continuous flow conduit. In some embodiments, the molar ratio of the lithium amide to the compound of formula (IIa) or (IIb) is in the range of about 10 to 0.1, about 5 to about 0.5, about 2 to about 0.8, or about 1.5 to about 1. In some embodiments, the molar ratio of the lithium amide to the compound of formula (IIa) or (IIb) is about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2. In some embodiments, the molar ratio of the lithium amide to the compound of formula (IIa) or (IIb) is about 1.1. In some embodiments, the molar ratio of the lithium amide to the compound of formula (IIa) or (IIb) is in the range of about 0.1-5, 0.1-4, 0.1-3, 0.1-2, 0.1-1.5, 0.1-1.25, 0.1-1, 0.1-0.8, 0.1-0.5, 0.5-5, 0.5-4, 0.5-3, 0.5-2, 0.5-1.5, 0.5-1.25, 0.5-1, 0.5-0.8, 0.1-5, 0.75-4, 0.75-3, 0.75-2, 0.75-1.5, 0.75-1.25, 0.75-1, or 0.75-0.8.

In embodiments where a continuous flow of the lithium amide is established prior to combination with tetrahydrofuran, the concentration of the lithium amide in the continuous flow prior to being combined with the tetrahydrofuran can vary depending on the reaction conditions. In some embodiments, the concentration of the lithium amide in the continuous flow prior to being combined with the tetrahydrofuran is about 25%. In some embodiments, the concentration of the lithium amide in the continuous flow prior to combination with the tetrahydrofuran is in the range of about 24% to about 26%. In some embodiments, the concentration of the lithium amide in the continuous flow prior to being combined with the tetrahydrofuran is in the range of about 15% to about 35%. In some embodiments, the concentration of the lithium amide in the continuous flow prior to combination with the tetrahydrofuran is in the range of about 1%-80%, 1%-60%, 1%-50%, 1%-40%, 1%-30%, 1%-27%, 1%-25%, 5%-80%, 5%-60%, 5%-50%, 5%-40%, 5%-27%, 5%-30%, 5%-25%, 10%-80%, 10%-60%, 10%-50%, 10%-40%, 10%-30%, 10%-27%, 10%-25%, 15%-80%, 15%-60%, 15%-50%, 15%-40%, 15%-30%, 15%-27%, 15%-25%, 20%-80%, 20%-60%, 20%-50%, 20%-40%, 20%-30%, 20%-27%, or 20%-25%.

The concentration of the lithium amide in the continuous flow after being combined with the tetrahydrofuran but prior to flowing into the first continuous flow conduit can vary depending on the reaction conditions. In some embodiments, the concentration of the lithium amide in the continuous flow after being combined with the tetrahydrofuran but prior to flowing into the first continuous flow conduit is about 5%, 10%, 20%, 30%, 40%, 45%, 50%, or 60%. In some embodiments, the concentration of the lithium amide in the continuous flow after being combined with the tetrahydrofuran but prior to flowing into the first continuous flow conduit is in the range of about 1% to about 80%, bout 10% to about 60%, or about 15% to about 50%. In some embodiments, the concentration of the lithium amide in the continuous flow after being combined with the tetrahydrofuran but prior to flowing into the first continuous flow conduit is in the range of about 1%-80%, 1%-60%, 1%-50%, 1%-40%, 1%-30%, 1%-27%, 1%-25%, 5%-80%, 5%-60%, 5%-50%, 5%-40%, 5%-27%, 5%-30%, 5%-25%, 10%-80%, 10%-60%, 10%-50%, 10%-40%, 10%-30%, 10%-27%, 10%-25%, 15%-80%, 15%-60%, 15%-50%, 15%-40%, 15%-30%, 15%-27%, 15%-25%, 20%-80%, 20%-60%, 20%-50%, 20%-40%, 20%-30%, 20%-27%, or 20%-25%.

The molar ratio of the compound of formula (III) to the compound of Formula (IIa) or (IIb) can vary depending on the reaction temperature and other reaction conditions in the continuous flow conduit. In some embodiments, the molar ratio of the compound of formula (III) to the compound of Formula (IIa) is about 0.5-3, about 0.8-2, or about 1-1.5. In some embodiments, the molar ratio of the compound of formula (III) to the compound of Formula (IIa) is about 1-1.5. In some embodiments, the molar ratio of Lewis acid to the compound of Formula (IIa) or (IIb) is higher than about 1. In some embodiments, the molar ratio of the compound of formula (III) to the compound of Formula (IIa) or (IIb) is about 0.5, 0.6, 0.7, 0.8, 0.9, 1, 1.1, 1.2, 1.3, 1.4, 1.5, 1.6, 1.7, 1.8, 1.9, or 2. In some embodiments, the molar ratio of the compound of formula (III) to the compound of Formula (IIa) or (IIb) is about 1.3. In some embodiments, the molar ratio of the compound of formula (III) to the compound of Formula (IIa) or (IIb) is in the range of about 0.1-5, 0.1-4, 0.1-3, 0.1-2, 0.1-1.5, 0.1-1.25, 0.1-1, 0.1-0.8, 0.1-0.5, 0.5-5, 0.5-4, 0.5-3, 0.5-2, 0.5-1.5, 0.5-1.25, 0.5-1, 0.5-0.8, 0.1-5, 0.75-4, 0.75-3, 0.75-2, 0.75-1.5, 0.75-1.25, 0.75-1, 0.75-0.8, 1-5, 1-4, 1-3, 1-2, 1-1.5, 1-1.3, 1-1.25, 1.15-1.5, or 1.15-1.25.

The concentration of HOBt in the vessel prior to reacting with the compound of formula (VI) may vary depending on the reaction condition. In some embodiments, the molar ratio of HOBt to the compound of formula (VI) is about 0.5-3, about 0.8-2, or about 0.9-1.1. In some embodiments, the molar ratio of HOBt to the compound of formula (VI) is about 0.8-1.2. In some embodiments, the molar ratio of HOBt to the compound of formula (VI) is higher than about 1. In some embodiments, the molar ratio of the HOBt to the compound of formula (IV) is about 0.5, 0.6, 0.7, 0.8, 0.9, 1, 1.1, 1.2, 1.3, 1.4, 1.5, 1.6, 1.7, 1.8, 1.9, or 2. In some embodiments, the molar ratio of HOBt to the compound of formula (VI) is about 1.3. In some embodiments, the molar ratio of HOBt to the compound of formula (VI) is in the range of about 0.1-5, 0.1-4, 0.1-3, 0.1-2, 0.1-1.5, 0.1-1.25, 0.1-1, 0.1-0.8, 0.1-0.5, 0.5-5, 0.5-4, 0.5-3, 0.5-2, 0.5-1.5, 0.5-1.25, 0.5-1, 0.5-0.8, 0.1-5, 0.75-4, 0.75-3, 0.75-2, 0.75-1.5, 0.75-1.25, 0.75-1, 0.75-0.8, 1-5, 1-4, 1-3, 1-2, 1-1.5, 1-1.3, 1-1.25, 1.15-1.5, or 1.15-1.25.

The concentration of EDC.HCl in the vessel prior to reacting with the compound of formula (VI) may vary depending on the reaction condition. In some embodiments, the molar ratio of EDC.HCl to the compound of formula (VI) is about 0.5-5, about 0.8-2, or about 0.9-1.5. In some embodiments, the molar ratio of EDC.HCl to the compound of formula (VI) is about 1-1.5. In some embodiments, the molar ratio of EDC.HCl to the compound of formula (VI) is higher than about 1. In some embodiments, the molar ratio of the EDC.HCl to the compound of formula (VI) is about 0.5, 0.6, 0.7, 0.8, 0.9, 1, 1.1, 1.2, 1.3, 1.4, 1.5, 1.6, 1.7, 1.8, 1.9, or 2. In some embodiments, the molar ratio of HOBt to the compound of formula (VI) is about 1.6:1.3. In some embodiments, the molar ratio of HOBt to the compound of formula (VI) is in the range of about 0.1-5, 0.1-4, 0.1-3, 0.1-2, 0.1-1.5, 0.1-1.25, 0.1-1, 0.1-0.8, 0.1-0.5, 0.5-5, 0.5-4, 0.5-3, 0.5-2, 0.5-1.5, 0.5-1.25, 0.5-1, 0.5-0.8, 0.1-5, 0.75-4, 0.75-3, 0.75-2, 0.75-1.5, 0.75-1.25, 0.75-1, 0.75-0.8, 1-5, 1-4, 1-3, 1-2, 1-1.5, 1-1.3, 1-1.25, 1.15-1.5, or 1.15-1.25.

In some embodiments, the amount of the compound of formula (VI) added into the vessel is about 1-1.3 molar equivalent of the compound of formula (IIa) or (IIb). In some embodiments, the amount of the compound of formula (VI) added into the vessel is about 0.8-1.6 molar equivalent of the compound of formula (IIa) or (IIb). In some embodiments, the amount of the compound of formula (VI) added into the vessel is about 1.1-1.3 molar equivalent of the compound of formula (IIa) or (IIb). In some embodiments, the amount of the compound of formula (VI) added into the vessel is about 1.2 molar equivalent of the compound of formula (IIa) or (IIb).

In some embodiments, the amount of HOBt added into the vessel is about 1-1.5 molar equivalent of the compound of formula (IIa) or (IIb). In some embodiments, the amount of HOBt added into the vessel is about 0.8-1.8 molar equivalent of the compound of formula (IIa) or (IIb). In some embodiments, the amount of HOBt added into the vessel is about 1.2-1.4 molar equivalent of the compound of formula (IIa) or (IIb). In some embodiments, the amount of HOBt added into the vessel is about 1.3 molar equivalent of the compound of formula (IIa) or (IIb).

In some embodiments, the amount of EDC.HCl added into the vessel is about 1-2 molar equivalent of the compound of formula (IIa) or (IIb). In some embodiments, the amount of EDC.HCl added into the vessel is about 0.5-2.5 molar equivalent of the compound of formula (IIa) or (IIb). In some embodiments, the amount of EDC.HCl added into the vessel is about 1.4-1.8 molar equivalent of the compound of formula (IIa) or (IIb). In some embodiments, the amount of EDC.HCl added into the vessel is about 1.6 molar equivalent of the compound of formula (IIa) or (IIb).

The flow rate of the compound of formula (IIa) or (IIb) in the first continuous flow conduit may vary depending on the reaction conditions. The process described herein can include flowing the compound of formula (IIa) or (IIb) into the first continuous flow conduit at a flow rate of about 0.05 mmol/min, 0.1 mmol/min, 0.12 mmol/min, 0.14 mmol/min, 0.16 mmol/min, 0.17 mmol/min, or 0.18 mmol/min. In some embodiments, the process described herein can further include flowing the compound of formula (IIa) or (IIb) into the first continuous flow conduit at a flow rate no greater than 0.5 mmol/min, 1 mmol/l, 1.5 mmol/min, 2 mmol/min, 2.5 mmol/min, 3 mmol/min, 3.5 mmol/min, 4 mmol/min, 4.5 mmol/min, or 5 mmol/min. In some embodiments, the process described herein can further include flowing the compound of formula (IIa) or (IIb) into the first continuous flow conduit at a flow rate of about 0.1 mmol/min to about 5.0 mmol/min, or about 1 mmol/min to about 3 mmol/min. In some embodiments, the compound of formula (IIa) or (IIb) flow rate is about 0.05 mmol/min to about 1.2 mmol/min, about 0.05 mmol/min to about 1.0 mmol/min, or 0.1 mmol/min to about 0.5 mmol/min. In some embodiments, the compound of formula (IIa) or (IIb) flow rate is about 0.17 mmol/min.

The flow rate of the lithium amide in the first continuous flow conduit may vary depending on the reaction conditions. The process described herein can include flowing lithium amide into the first continuous flow conduit at a flow rate of about 0.2 mmol/min, 0.4 mmol/min, 0.6 mmol/min, 0.8 mmol/min, 1 mmol/min, 1.2 mmol/min, or 1.5 mmol/min. The process described herein can further include flowing the lithium amide into the first continuous flow conduit at a flow rate of about 0.2 mmol/min to about 5 mmol/min, about 0.5 mmol/min to about 2 mmol/min, or about 0.7 to about 0.9 mmol/min. In some embodiments, the lithium amide flow rate is about 0.87 mmol/min. In some embodiments, the lithium amide flow rate is about 0.9 mmol/min. In some embodiments, the lithium amide flow rate is in the range of about 0.1-5, 0.1-4, 0.1-3, 0.1-2, 0.1-1.5, 0.1-1.25, 0.1-1, 0.1-0.9, 0.1-0.8, 0.1-0.5, 0.5-5, 0.5-4, 0.5-3, 0.5-2, 0.5-1.5, 0.5-1.25, 0.5-1, 0.5-0.9, 0.5-0.8, 0.1-5, 0.75-4, 0.75-3, 0.75-2, 0.75-1.5, 0.75-1.25, 0.75-1, 0.75-0.9, or 0.75-0.8 mmol/min. In some embodiments, the process described herein can further include flowing the lithium amide into the first continuous flow conduit at a flow rate no greater than 0.5 mmol/min, 1 mmol/l, 1.5 mmol/min, 2 mmol/min, 2.5 mmol/min, 3 mmol/min, 3.5 mmol/min, 4 mmol/min, 4.5 mmol/min, or 5 mmol/min.

In some embodiments, the reaction between of the second reaction intermediate with compound of formula (III) is not performed in a continuous flow conduit. In some embodiments, the reaction between of the second reaction intermediate with compound of formula (III) is performed in a flask or other reaction vessel that does not involve continuous flowing.

The process described herein can also include one or more steps known by those skilled in the art to be suitable for separating and purifying the compound of formula (Ia) or (Ib). The separation and/or purification can include extraction, distillation, chromatography, crystallization, and other suitable purifying methods known by those skilled in the art. For example, the separation and/or purification can include multiple extraction steps using the same or different solvents in each extraction step, and one or more distillation steps can be used following the extraction to further purify the final product. In some embodiments, the purification includes a crystallization step.

The process described herein can further include one or more steps of preparing stock solution of the various reagents. In some embodiments, the process described herein can further include combining lithium amide and tetrahydrofuran to prepare an lithium amide stock solution for the first continuous flow of the lithium amide. In an embodiment wherein the continuous flow of tetrahydrofuran and the continuous flow of the lithium amide are provided separately. In some embodiments, the process described herein can further include combining the compound of formula (IIa) or (IIb) and tetrahydrofuran to provide the compound of formula (IIa) or (IIb) stock solution for the continuous flow of the compound of formula (IIa) or (IIb). In some embodiments, the process described herein can further include combining the compound of formula (IIa) or (IIb), tetrahydrofuran, and trimethylsilyl chloride to provide the compound of formula (IIa) or (IIb) stock solution for the continuous flow of the compound of formula (IIa) or (IIb).

The process described herein can also include pressurizing the vessel containing the stock solutions. In some embodiments, the process described herein includes pressurizing the first or the fifth vessel comprising the lithium amide stock solution. In some embodiments, the process described herein includes pressurizing the second or sixth vessel comprising the compound of formula (IIa) or (IIb) stock solution. In an embodiment wherein the continuous flow of tetrahydrofuran and the continuous flow of the lithium amide are provided separately, the process described herein can further include preparing a stock solution of the lithium amide in tetrahydrofuran and pressurizing a vessel comprising the lithium amide in tetrahydrofuran stock solution. In such an embodiment, the process described herein can further include preparing a stock solution of tetrahydrofuran and pressurizing a vessel comprising the tetrahydrofuran stock solution.

In some embodiments, the process includes producing the compound of Formula Ia. In some embodiments, for the compound of Formula (Ia), M is —CH=CH— and n is 1. In some embodiments, for the compound of Formula (Ia), M is —CH$_2$— and Q is —CH$_2$— or —CH$_2$—CH$_2$—.

In some embodiments, the process includes producing the compound of Formula (Ib) or salt thereof.

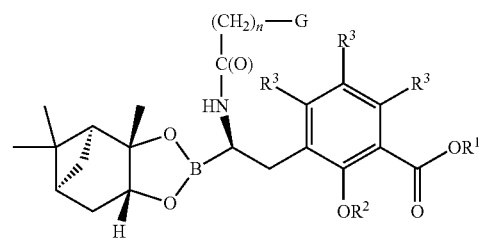

R$^1$ can be any suitable carboxylic acid protection group, such as ester forming groups or silyl groups. In some embodiments, R$^1$ is tert-butyl (t-Bu). In some embodiments, R$^1$ is selected from methyl, ethyl, propyl, isopropyl, t-butyl, t-amyl, benzyl, p-nitrobenzyl, p-methoxybenzyl, benzhydryl, phenacyl, phenyl, p-nitrophenyl, methoxymethyl, ethoxymethyl, benzyloxymethyl, acetoxymethyl, pivaloyloxymethyl, β-methylsulfonylethyl, methylthiomethyl, trityl, β,β,β-trichloroethyl, β-iodoethyl, trimethylsilyl, dimethylsilyl, acetylmethyl, p-nitrobenzoylmethyl, p-mesylbenzoylmethyl, phthalimidomethyl, propionyloxymethyl, 1,1-dimethylpropyl, 3-methyl-3-butenyl, succinimidomethyl, 3,5-di-t-butyl-4-hydroxybenzyl, mesylmethyl, benzenesulfonyl-methyl, phenylthiomethyl, dimethylaminomethyl, pyridine-1-oxide-2-methyl, methylsulfinylmethyl, bis(p-methoxyphenyl)methyl, or 2-cyano-1,1-dimethylethyl. Some commonly used carboxylic acid protection groups are t-butyl, benzyl, β,β,β-trichloroethyl, p-nitrobenzyl, p-methoxybenzyl, trimethylsilyl, dimethyl-t-butylsilyl, phenacetyl or acetonyl.

$R^2$ can be any suitable hydroxyl protection group. In some embodiments, $R^2$ is tert-butyldimethylsilyl (TBDMS). In some embodiments, $R^2$ is selected from benzyl, benzoyl, 2,6-dichlorobenzyl, t-butyldimethylsilyl, t-butyldiphenylsilyl, mesylate, tosylate, dimethoxytrityl (DMT), 9-phenylxanthine-9-yl (Pixyl) and 9-(p-methoxyphenyl)xanthine-9-yl (MOX), acetyl, benzyl, or 4,4'-dimethoxytrityl.

In some embodiments, the compound of Formula Ia

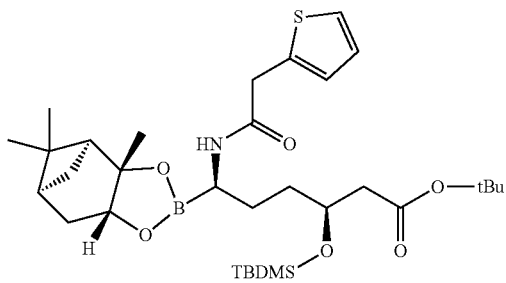

or salt thereof.

In some embodiments, the compound of Formula (IIa) is

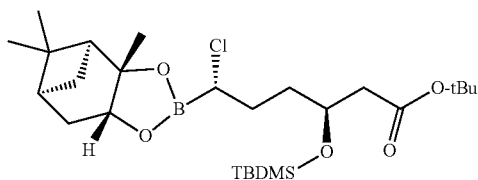

or salt thereof.

The process described herein can further include performing the reaction of the compound of formula (III) and the second reaction intermediate under a nitrogen or argon atmosphere.

In some embodiments, the process described herein can further include analyzing a reaction flow sample taken after the first continuous flow conduit but before the second continuous flow conduit. In some embodiments, the process described herein can further include analyzing a reaction flow sample taken after the second continuous flow conduit but before the vessel that contains the compound of formula (III).

The analysis of reaction samples can be performed using any suitable known analytic methods. In some embodiments, the process described herein includes analyzing the reaction sample using a chromatography. In some embodiments, the process described herein includes analyzing the reaction sample using a HPLC.

The process described herein can be used for production of the compound of formula (Ia) or (Ib) on a plant scale or pilot plant scale. The process described herein can be used to produce over about 10 kg, 20 kg, 50 kg, 80 kg, 100 kg, 150 kg, 180 kg, or 200 kg of the compound of formula (Ia) or (Ib) per day.

In some embodiments, an additional flow for THF can be introduced to have better control over lithium amide concentration and stoichiometry and help enhance process robustness by prevention blocking of the LT tube reactor by precipitation of the lithium amide.

In some embodiments, compound (IIa) or (IIb) concentration can be reduced or adjusted based on the lithium amide concentration in the flow after the dilution using an additional flow of THF. The dilution using an additional flow of THF can help ensure higher yield and better conversion of raw materials comparative to other known process.

In some embodiments, the continuous flow conduit, including the first and the second continuous flow conduit, can be lengthened so increase the residence time to an extent that additional stirring in collection vessel at ambient temperature is no longer required to achieve full conversion of starting material compound of formula (IIa) or (IIb). This can help simply the process, shorten the production time, and save the use of any stirring vessel.

In some embodiments, full conversion of the starting material compound of formula (IIa) or (IIb) can be achieved in the process and the second reaction intermediate (e.g., compound 2d) can be directly delivered to the solution containing the active ester compound of formula (III).

In some embodiments, the amount of impurity compound resulted from lithium amide side reaction (e.g. compound S1 or S2) is less than about 10%, 8%, 6%, 5%, 4%, 3%, 2%, 1.5%, 1%, 0.5%, 0.25% or 0.1% in the final product. In some embodiments, the amount of impurity compound resulted from lithium amide side reaction (e.g. compound S1 or S2) is less than about 5% in the final product. In some embodiments, the amount of impurity compound resulted from lithium amide side reaction (e.g. compound S1 or S2) is less than about 1.4% in the final product. In some embodiments, the amount of impurity compound resulted from lithium amide side reaction (e.g. compound S1 or S2) is less than about 1% in the final product. In some embodiments, the amount of impurity compound resulted from lithium amide side reaction (e.g. compound S1 or S2) is less than about 0.9% in the final product. In some embodiments, the amount of impurity compound resulted from lithium amide side reaction (e.g. compound S1 or S2) is in the range of about 0.1% to about 10%, about 0.1% to about 5%, about 0.15 to about 1.0% in the final product.

In some embodiments, the amount of the diastereomer of the compound of formula (Ia) or (Ib) is less than about 1% in the final product. In some embodiments, the amount of the diastereomer of the compound of formula (Ia) or (Ib) is less than about 0.9%, 0.8%, 0.6%, 0.4%, 0.2%, or 0.1% in the final product. In some embodiments, the amount of the diastereomer of the compound of formula (Ia) or (Ib) is in the range of about 0.1% to about 10%, about 0.1% to about 5%, about 0.15 to about 1.0% in the final product.

In some embodiments, the amount of total impurities is less than about 10%, 8%, 6%, 5%, 4%, 3%, 2%, 1.5%, 1%, 0.5%, 0.25% or 0.1% in the final product. In some embodiments, the amount of total impurities is less than about 8% in the final product. In some embodiments, the amount of total impurities is less than about 1.7% or 1.6% in the final product. In some embodiments, the amount of total impurities is less than about 1.4% in the final product. In some embodiments, the amount of total impurities is less than about 1.33% in the final product. In some embodiments, the amount of total impurities is in the range of about 0.1% to about 10%, about 0.1% to about 8%, about 0.15 to about 1.6% in the final product.

In some embodiments, the amount of compound A diastereomer is less than about 10%, 8%, 6%, 5%, 4%, 3%, 2%, 1.5%, 1.2%, 1%, 0.9%, 0.8%, 0.7%, 6%, 0.5%, 0.4%, 0.3%, 0.2%, 0.1%, 0.08%, 0.07%, 0.06%, 0.04%, 0.025% or 0.01% in the final product. In some embodiments, the amount of compound A diastereomer is less than about 0.4% in the final product. In some embodiments, the amount of compound A diastereomer is less than about 0.07% in the final product. In some embodiments, the amount of compound A diastereomer is less than about 0.05% in the final product. In some embodiments, the amount of compound A diastereomer is in the range of about 0.001% to about 1%, about 0.01% to about 0.5%, about 0.01% to about 0.4% in the final product.

In some embodiments, the amount of any single unknown impurity is less than about 10%, 8%, 6%, 5%, 4%, 3%, 2%, 1.5%, 1.2%, 1%, 0.9%, 0.8%, 0.7%, 6%, 0.5%, 0.4%, 0.3%, 0.2%, 0.1%, 0.08%, 0.07%, 0.06%, 0.04%, 0.025% or 0.01% in the final product. In some embodiments, the amount of any single unknown impurity is less than about 0.4% in the final product. In some embodiments, the amount of any single unknown impurity is less than about 0.07% in the final product. In some embodiments, the amount of any single unknown impurity is less than about 0.05% in the final product. In some embodiments, the amount of any single unknown impurity is in the range of about 0.001% to about 1%, about 0.01% to about 0.5%, about 0.01% to about 0.4% in the final product.

Apparatus for a Continuous Production Process

FIG. 1 is a non-limiting schematic of an apparatus for a continuous production process as described herein. FIG. 1 shows an apparatus 100 for production of a compound of Formula (Ia) or (Ib) or salt thereof,

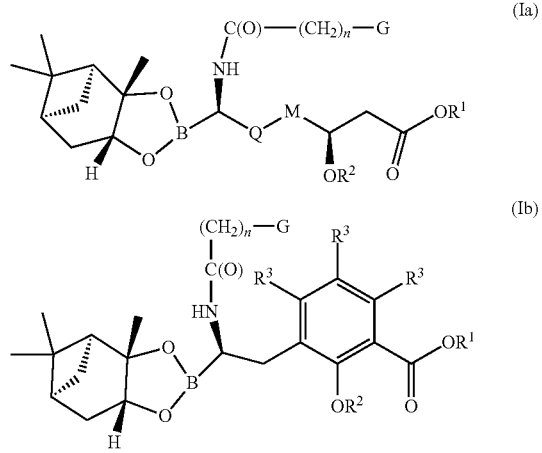

wherein the apparatus 100 includes:

a first vessel 101 comprising lithium amide;

a second vessel 102 comprising a compound of Formula (IIa) or (IIb) or salt thereof;

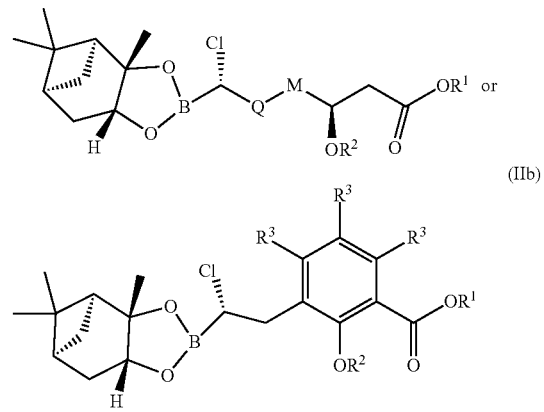

a third vessel 105 comprising a compound of Formula (III) or salt thereof;

A-O—C(O)—(CH$_2$)$_n$G a first continuous flow conduit 103 configured to be fluidly coupled to the first vessel 101 and the second vessel 102; and a second continuous conduit 104 configured to be fluidly coupled between the first continuous flow conduit 103 and the third vessel 105.

Figure 2:
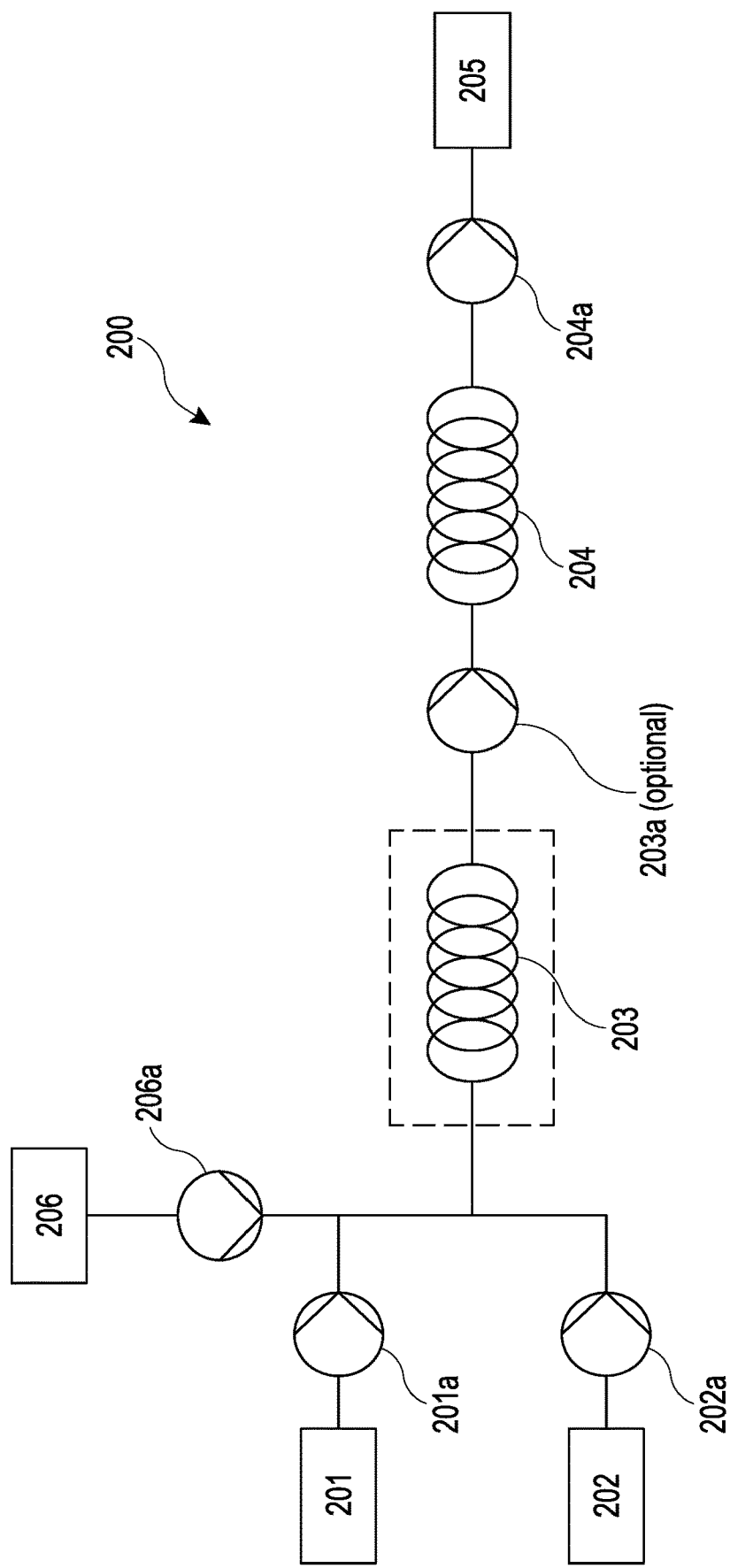
FIG. 2 illustrates a non-limiting schematic of a continuous flow apparatus.

FIG. 2 is a non-limiting schematic of an apparatus for a continuous production process as described herein. FIG. 2 shows an apparatus 200 for production of a compound of Formula Ia or Ib or salt thereof, wherein the apparatus 200 includes:

a first vessel 201 comprising lithium amide;

a second vessel 202 comprising a compound of Formula (IIa) or (IIb) or salt thereof;

a third vessel 205 comprising a compound of Formula (III) or salt thereof;

a fourth vessel 206 comprising tetrahydrofuran;

a first continuous flow conduit 203 configured to be fluidly coupled to the first vessel 201 and the second vessel 202; and a second continuous conduit 204 configured to be fluidly coupled between the first continuous flow conduit 203 and the third vessel 205.

The apparatus described herein can optionally include one or more vessels containing the stock solutions of one or more reagents. In some embodiments, the apparatus described herein can further include a fourth vessel, wherein the fourth vessel comprises tetrahydrofuran and is fluidly coupled with the first vessel to combine the lithium amide and the tetrahydrofuran before the lithium amide flowing into the first continuous flow conduit. In some embodiments, the apparatus described herein can include a fifth flow conduit, wherein the fifth continuous flow conduit is fluidly coupled the fourth vessel and the first continuous flow conduit to deliver the tetrahydrofuran from the fourth vessel to the first continuous flow conduit.

In some embodiments, the apparatus described herein can include optionally a third continuous flow conduit to fluidly couple the first vessel and the first continuous flow conduit, and wherein the third continuous flow conduit is configured to deliver the lithium amide from the first vessel to the first continuous flow conduit. In some embodiments, the apparatus described herein can optionally include a fourth continuous flow conduit to fluidly couple the second vessel and the first continuous flow conduit, and wherein the fourth continuous flow conduit is configured to deliver the compound of formula (IIa) or (IIb) from the second vessel to the first continuous flow conduit. In some embodiments, the apparatus described herein can include a fourth continuous flow conduit to fluidly couple the second vessel and the first continuous flow conduit, and wherein the fourth continuous flow conduit is configured to deliver the compound of formula (IIa) or (IIb) and/or trimethylsilyl chloride from the second vessel to the first continuous flow conduit. In some embodiments, the apparatus described herein can optionally include a fifth continuous flow conduit to fluidly couple the fourth vessel and the first continuous flow conduit, and wherein the fifth continuous flow conduit is configured to deliver the tetrahydrofuran solution from the fourth vessel to the first continuous flow conduit.

In some embodiments, the apparatus described herein can optionally further include a sixth vessel fluidly coupled to the first vessel, wherein the sixth vessel comprises a stock solution of the lithium amide. In some embodiments, the apparatus described herein can optionally further include a seventh vessel fluidly coupled to the second vessel, wherein the seventh vessel comprises a stock solution of the compound of Formula (IIa) or (IIb). In some embodiments, the apparatus described herein can optionally further include an eighth vessel fluidly coupled to the second vessel, wherein the eighth vessel comprises a stock solution of the compound of trimethylsilyl chloride.

One or more flow control members can be used in the apparatus to control the flow rate. The apparatus described herein can further include one or more flow control members fluidly coupled to the vessels comprising stock solutions of the lithium amide, tetrahydrofuran, trimethylsilyl chloride, or the compound of formula (IIa) or (IIb). The flow control members can be a pneumatic flow control including but not limited to a pressurized vessel; a valve; any pump known to be suitable for flow control, including but not limited to a syringe pump; any other flow control equipment known in the art; and combinations thereof.

The vessel containing a stock solution can be pressurized depending on the flow control member used in the apparatus. In an embodiment wherein a valve is used to control the flow rate, a pressurized vessel containing a stock solution instead of a pump can be used in the apparatus described herein. In some embodiments, the vessel which comprises a stock solution of the lithium amide can be pressurized. In some embodiments, the vessel which comprises a stock solution of the compound of formula (IIa) or (IIb) can be pressurized. In some embodiments, the vessel which comprises a stock solution of the trimethylsilyl chloride compound can be pressurized. In some embodiments, the first vessel is pressurized. In some embodiments, the second vessel is pressurized. In some embodiments, the third vessel is pressurized. In some embodiments, the fourth vessel is pressurized. In some embodiments, the fifth vessel is pressurized. In some embodiments, the sixth vessel is pressurized. In some embodiments, the seventh vessel is pressurized. In some embodiments, the eighth vessel is pressurized.

As shown in FIG. 1, the first vessel 101 is fluidly coupled to the first continuous flow conduit 103 through a valve 101*a*, and the second vessel 102 is fluidly coupled to the continuous flow conduit 103 through a valve 102*a*. As shown in FIG. 2, an additional vessel, the fourth vessel 206 for the tetrahydrofuran can be fluidly coupled to the first continuous flow conduit through a valve 206*a*.

One or more vessels in the apparatus can be a continuous flow conduit. In some embodiments, the first vessel 101 or 201 can optionally include a third continuous flow conduit, wherein the third continuous flow conduit is fluidly coupled with the first continuous flow conduit 103 or 203 to help deliver the solution in the first vessel 101 or 201 into the first continuous flow conduit 103 or 203. In some embodiments, the second vessel 102 or 202 can optionally include a fourth continuous flow conduit, wherein the fourth continuous flow conduit is fluidly coupled with the first continuous flow conduit 103 or 203 to help deliver the solution in the second vessel 102 or 202 into the first continuous flow conduit 103 or 203. In some embodiments, the third vessel 105 or 205 can optionally include a fifth continuous flow conduit, wherein the fifth continuous flow conduit is fluidly coupled with the second continuous flow conduit 104 or 204 to help flow the solution in the second continuous flow conduit 104 or 204 into the third vessel 105 or 205. In some embodiments, the first vessel 101 or 201 does not contain a continuous flow conduit. In some embodiments, the second vessel 102 or 202 does not contain a continuous flow conduit. In some embodiments, the third vessel 105 or 205 does not contain a continuous flow conduit.

In some embodiments, the fourth vessel 206 can optionally include a continuous flow conduit. In some embodiments, the fourth vessel 206 does not have a continuous flow conduit.

In some embodiments, for apparatus that includes a fifth vessel, the fifth vessel can optionally include a continuous flow conduit. In some embodiments, the fifth vessel is fluidly coupled to the first vessel and the fifth vessel comprises a stock solution of the lithium amide. In some embodiments, the sixth vessel can optionally include a continuous flow conduit. In some embodiments, for apparatus that includes a sixth vessel, the sixth vessel is fluidly coupled to the second vessel and the sixth vessel comprises a stock solution of the compound of formula (IIa) or (IIb). In some embodiments, for apparatus that includes a seventh vessel, the seventh vessel can optionally include a continuous flow conduit. In some embodiments, the seventh vessel is fluidly coupled to the second vessel and the seventh vessel comprises a stock solution of the trimethylsilyl chloride. In some embodiments, for apparatus that includes an eighth vessel, the eighth vessel can optionally include a continuous flow conduit. In some embodiments, the eighth vessel is fluidly coupled to the third vessel and the eighth vessel comprises a stock solution of tetrahydrofuran.

The apparatus described herein can further include one or more cooling elements. In some embodiments, the cooling elements are thermally coupled to the first continuous flow conduit 103 or 203. In some embodiments, the cooling elements are thermally coupled at least one of the first continuous flow conduit 103 or 203, the third continuous flow conduit, the fourth continuous flow conduit, and the fifth continuous flow conduit. In some embodiments, the cooling elements are thermally coupled at least one of the third continuous flow conduit, the fourth continuous flow conduit, and the fifth continuous flow conduit. The apparatus described herein can further include one or more cooling elements thermally coupled to at least one of the first vessel 101 or 201, the second vessel 102 or 202, the third vessel 105 or 205, and/or the fourth vessel 206. The apparatus described herein can further include a cooling element thermally coupled to the fourth vessel 106 or 206. The apparatus described herein can optionally further include a cooling element thermally coupled to the fifth, sixth, and seventh vessels. In an embodiment that a continuous flow of tetrahydrofuran is provided separately from a continuous flow of the lithium amide before the two flows are combined, the apparatus described herein can further include a cooling element thermally coupled to the alkyl amide solution vessel and the tetrahydrofuran solution vessel.

The apparatus described herein can further include one or more heating elements. In some embodiments, the heating element is used to warm up the reaction mixture that flows out of the first continuous flow conduit 103 or 203. In some embodiments, the heating elements are thermally coupled to the second continuous flow conduit 104 or 204. In some embodiments, the heating elements are thermally coupled to the third vessel 105 or 205. The heating element can be any suitable heating equipment known in the art.

The apparatus described herein can further include a gas purging member configured to purge the apparatus with nitrogen or argon atmosphere.

The continuous flow conduit can be made of any suitable materials known in the art for conducting chemical reactions performed under low temperatures. In some embodiments, the continuous flow conduit can be made of stainless steel. In some embodiments, the first and second continuous flow conduits are made of stainless steel. In some embodiments, the first, the second, the third, and the fourth vessels are made of stainless steel.

In some embodiments, the third vessel 105 or 205 is not a continuous flow conduit. In some embodiments, the third vessel 105 or 205 can be a flask or a reaction vessel that does not involve the reaction mixture flowing out of the flask or reaction vessel.

The dimension of the continuous flow conduit can vary depending on the reaction conditions and the production scale. Each continuous flow conduit can have a size that is different from or same as the other continuous flow conduit. In some embodiments, the continuous flow conduit is made of a tubing having a length in the range of about 0.1 m to about 50 m, about 0.1 m to about 25 m, or about 0.1 m to about 10 m. The tubing can be of straight or spiral.

The apparatus described herein can include one or more valves positioned following the continuous flow conduit. In some embodiments, the apparatus described herein includes a valve immediately downstream of the first continuous flow conduit. In some embodiments, the apparatus described herein includes a valve immediately downstream of the second continuous flow conduit.

The apparatus described herein can further include one or more flow control members fluidly coupled to the first, the second, the third, the fourth, the fifth, the sixth, or the seventh vessel. In some embodiments, the flow control member is fluidly coupled to the input of the first, the second, or the third vessel. In some embodiments, the flow control member is fluidly coupled to the output of the first, the second, or the third vessel. In some embodiments, the flow control member is fluidly coupled to at least one of the first, the second, and the third vessels. In some embodiments, the flow control member is fluidly coupled to the output of the fifth, sixth, or seventh vessel. In some embodiments, the flow control member is fluidly coupled to the input of the fourth vessel.

In some embodiments, the apparatus here is used for the production of the compound of Formula (Ia). In some embodiments, the apparatus here is used for the production of the compound of Formula (Ib). In some embodiments, the second vessel includes the compound of Formula (IIa). In some embodiments, the second vessel includes the compound of Formula (IIb).

The apparatus described herein can be used for production of the compound of formula (Ia) or (Ib) on a plant scale. The apparatus described herein can be used to produce more than about 10 kg, 100 kg, 250 kg, 500 kg, 800 kg of the compound of formula (Ia) or (Ib) per day.

The following examples will further describe the present invention, and are used for the purposes of illustration only, and should not be considered as limiting.

EXAMPLES

General Analytical Methods

With reference to Table 1 below and the compounds shown in Comparative Example 1, an analytical method having parameters shown in Table 1 can be used to analyze samples taken from at various points in the flow process.

TABLE 1

An overview of the analytical method parameters

| | Method A-1 and B-1: Compound 2a wt % (HPLC-CAD) | Method B-2: Compound A wt %, % a (derivatization, HPLC UV) | Final Product: compound A wt %, % a (HPLC UV) |
|---|---|---|---|
| Column | Phenomenex Kinetex $C_8$ 75 mm × 3.0 mm, 2.6 μm | Phenomenex Kinetex $C_8$ 75 mm × 3.0 mm, 2.6 μm | Phenomenex Kinetex $C_8$ 75 mm × 3.0 mm, 2.6 μm |
| Column Flow | 1.0 ml/min | 1.0 ml/min | 1.0 ml/min |
| Column Temperature | 15° C. | 15° C. | 15° C. |
| wavelength | n.a. (CAD) | 235 nm | 235 nm |
| Injection volume | 8 μL | 8 μL | 8 μL |
| Eluent A | Water + 0.1% formic acid | Water + 0.1% formic acid | Water + 0.1% formic acid |
| Eluent B | Acetonitrile + 0.1% formic acid | Acetonitrile + 0.1% formic acid | Acetonitrile + 0.1% formic acid |
| Diluent | Acetonitrile | Acetonitrile | Acetonitrile |
| Gradient | T (min)　A　B<br>0　　40　60<br>8　　25　75<br>12　　10　90<br>16　　10　90 | T (min)　A　B<br>0　　40　60<br>8　　25　75<br>12　　10　90<br>16　　10　90 | T (min)　A　B<br>0　　40　60<br>8　　25　75<br>12　　10　90<br>16　　10　90 |

TABLE 1-continued
An overview of the analytical method parameters
| Method A-1 and B-1: Compound 2a wt % (HPLC-CAD) | | | Method B-2: Compound A wt %, % a (derivatization, HPLC UV) | | | Final Product: compound A wt %, % a (HPLC UV) | | |
|---|---|---|---|---|---|---|---|---|
| 16.1 | 40 | 60 | 16.1 | 40 | 60 | 16.1 | 40 | 60 |
| 20 | 40 | 60 | 20 | 40 | 60 | 20 | 40 | 60 |
| Run time | 20 min (4 min post run) | | 20 min (4 min post run) | | | 20 min (4 min post run) | | |
Comparative Example 1
The reactions described in Scheme 2 were performed in a batch experiment.
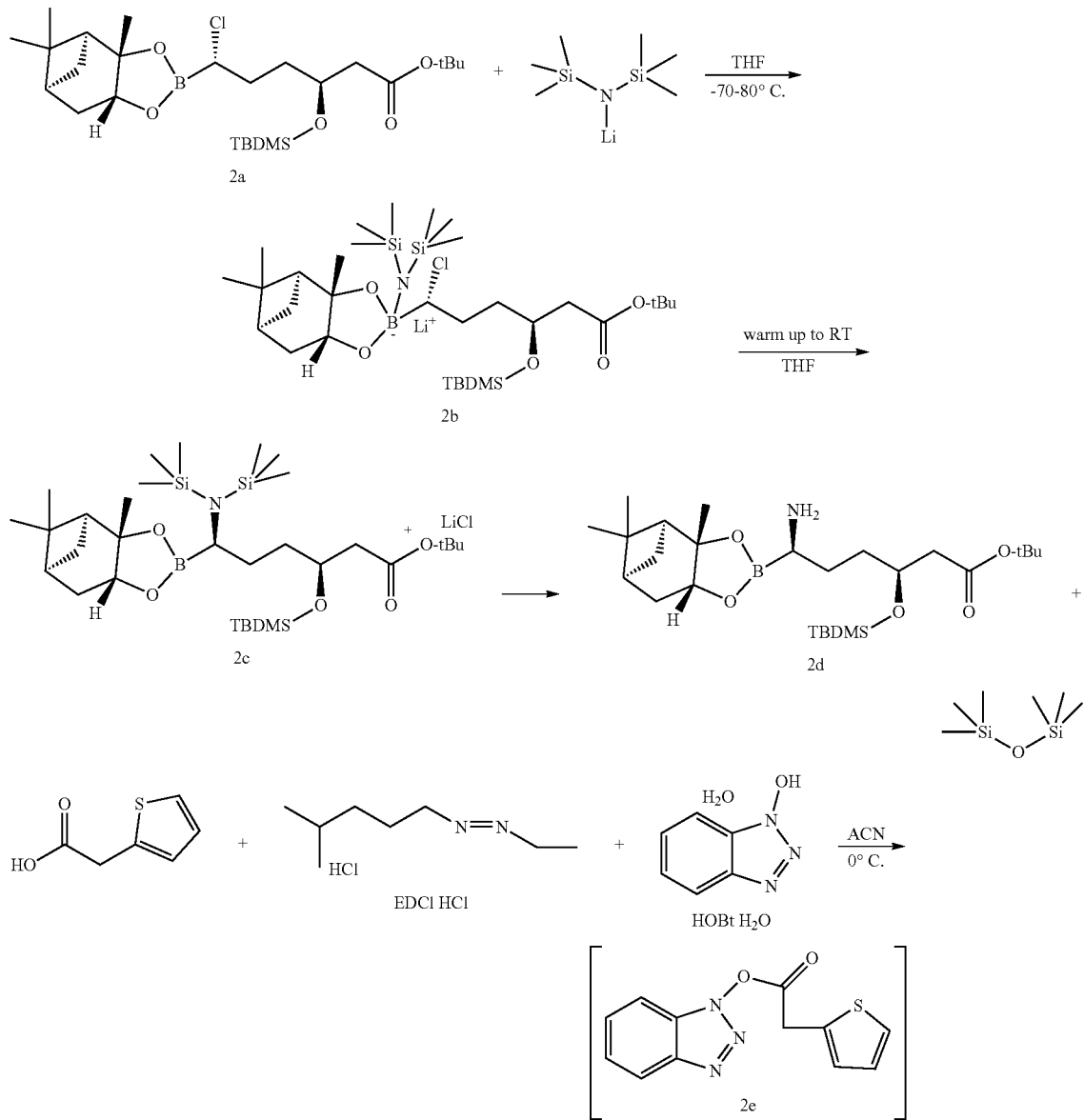
Scheme 2.

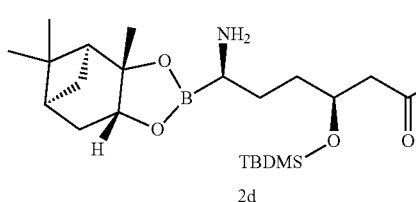 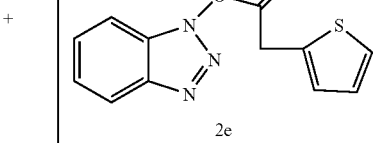

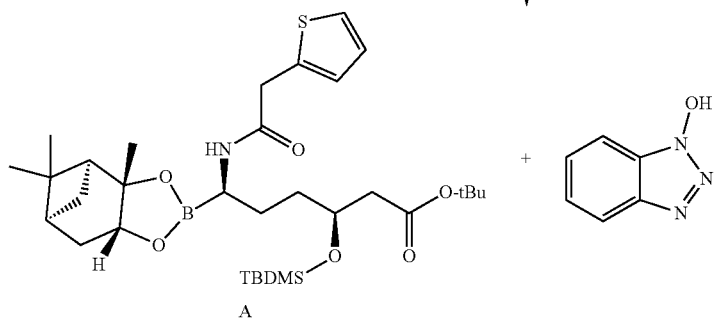

An approx. 27% solution of compound 2a in THF was mixed with a small amount of TMS-Cl (3 mol %) and cooled to −70° C. to −80° C. 1.10 equiv. (based on w % Compound 2a by HPLC) of a 25% solution of LHMDS in THF (pre-cooled to −10° C.) was dosed in a way that the reaction temperature was maintained below −70° C. After complete addition, the mixture was stirred for an additional 30 min at −70° C. and was analyzed for residual Compound 2a by method A (<2.5% % wt compound 2a remaining). A sample of the reaction mixture was taken to determine whether any additional amount of LHMDS should be added. Then the mixture was warmed to ambient temperature and further stirred (typically: 1-3 h), until complete conversion was detected by chromatography.

For preparation of Compound 2e, a slurry of purified 2-thiophen-acetic acid and hydroxybenzotriazole in acetonitrile was pre-cooled to −5 to 5° C. and 1-ethyl-3-(3-dimethylaminopropyl)carbodiimide hydrochloride (EDC.HCl) was added in portions in a way that the temperature can be maintained at −5 to 5° C.

The resulting mixture was further stirred for 2-5 h at −5 to 5° C. Finally, the aforementioned reaction mixture from step 1 was dosed to the compound 2d at −5 to 5° C., and the resulting slurry was stirred for 3 h at −5 to 5° C. and then warmed to ambient temperature.

The mixture was quenched by addition of an approx. 5% aqueous NaHCO₃ solution. Heptane was added, and the layers were separated. The upper product-containing organic layer was subsequently washed another two times with approx. 5% aqueous NaHCO₃ and water, and filtered over carbon cartridges. Finally, a distillative solvent switch to heptane was performed under reduced pressure at T<40° C. (target: 20-25° C.), with verification of complete removal of acetonitrile with chromatography method A (A-2). The product usually started to precipitate at this stage. If precipitation did not begun, seed crystals were added to induce crystallization. The resulting product slurry was cooled to −5 to 5° C. and was further stirred for 2 h at that temperature. The product Compound A was collected by filtration, washed in portions with cold heptane and dried under reduced pressure at <45° C. The final product was analyzed using method A (A-3).

Example 1

The experimental set-up 100 as schematically outlined in FIG. 1 was used. As shown in FIG. 1, a first vessel 101 is used for storing and providing the lithium bis(trimethylsilyl) amide solution (in THF), a second vessel 102 is used for storing and providing a compound 2a solution in tetrahydrofuran. A first continuous flow conduit 103 is used for mixing the lithium bis(trimethylsilyl)amide and compound 2a reagents and for delivering the reaction mixture to the next step. A second continuous flow conduit 104 is used to warm up the reaction mixture that flows out of the first continuous flow conduit 103 and to deliver the reaction mixture to the next step. A vessel 105 is used for carrying out the reaction of making compound 2e and for collecting the compound 2d that flows out of the second continuous flow conduit 104 so that compound 2e and compound 2d can react to form compound A.

During the reaction process, the lithium bis(trimethylsilyl)amide stock solution in THF was continuously added into the reaction process from the vessel 101 through a valve 101a and the lithium bis(trimethylsilyl)amide was pre-cooled before reaching the first continuous flow conduit 103; a compound 2a stock solution in THF was continuously added into the reaction process from the vessel 102 through a valve 102a; the mixture of lithium bis(trimethylsilyl)amide and compound 2a continuously flowed through the first continuous flow conduit 103, which was maintained at about −30° C. using a cooling bath 106. The reaction mixture flowed from the first continuous conduit 103 to the second continuous flow conduit 104, which was maintained at an ambient temperature or maintained between 20° C.-30° C. using a bath 107. The second continuous flow conduit 104 was used to warm up the reaction mixture that flowed out of the first continuous flow conduit 103. The reaction mixture was then delivered to a vessel 105. The vessel 105 was maintained at −5° C. to 50C and contained compound 2e.

The mixture of compound 2d and compound 2e were stirred in the vessel for 2-5 hours before a sample was taken to determine the yield of compound A. As illustrated in FIG. 1, a valve such as 101a, 102a, or 104a can be used to fluidly couple to a vessel or to a continuous flow conduit to control the flow of the reaction solutions. Based on the reaction condition, the set-up may include only one of the three valves 101a, 102a, and 104a; the set-up may include any two of the three valves 101a, 102a, and 104a; or the set-up may include all three valves 101a, 102a, and 104a. An additional valve 103a may be optionally added between the first continuous flow conduit and the second continuous flow conduit. The set-up shown in FIG. 2 can optionally include one or more other valves (not shown in the figure) to control the flow of the reaction at one or more other points in the set-up.

The set-up was operated at constant flows and a cooling bath was used to pre-cool the solutions and to maintain the needed reaction temperature. The first part of the set-up, (for LHMDS addition) was operated at low temperature (low temperature flow reactor). Sections of the set-up, including the tubes for delivering the lithium bis(trimethylsilyl)amide and/or the compound 2a solution were pre-cooled to guarantee fast mixing of the two flows and an efficient heat transfer. The second part of the flow reactor, (for rearrangement reaction) was operated at elevated temperature (in this case at room temperature—RT flow reactor). The key element of this set-up was to warm up the reaction solution to target temperature. After the RT flow reactor run the solution was collected in a vessel and stirred at ambient temperature until full conversion was reached (based on chromatography method A in batch process on less than 1.0% wt of compound 2a remaining). This solution was then dosed to the solution of the ester 2e, which was prepared according to batch protocol and further treated as in the batch protocol.

A method B (B-1) sample can be pulled after the low temperature reactor run to check the conversion rate. For further control over the reaction conditions method B was introduced: The method A sample was converted to the second reaction intermediate using the active ester and the sample was analyzed after completed amidation (in this case derivatization). This method gives an overview about the expected product quality and yield after the rearrangement reaction.

Example 2

The experimental set-up 100 as schematically outlined in FIG. 1 was used. The vessel 101 for storing and providing lithium bis(trimethylsilyl)amide (25% in THF) was set to be about 1.5-1.0 mol eq. of compound 2a. The vessel 102 for compound 2a was diluted with THF to a final concentration of 27 w %. Both lithium bis(trimethylsilyl)amide and compound 2a solutions were precooled to the operating temperature "low temperature" of about −30° C. continuous flow conduit. The low temperature continuous flow conduit had a length of 12 m, diameter of 0.88 cm, which corresponded to a residence time of about 70 sec. The room temperature continuous flow conduit had a length of 12 m, diameter of about 1.73 cm, which corresponded to a residence time of 4.5 min. Two additional vessels (not shown in FIG. 1) were installed after the continuous flow conduit: one each for pre- and post-run (start and Shutdown sequence). The first vessel was used for collecting waste at the beginning of the run until all flows were properly established. The second vessel was used in case of a problem such as clogging, in which case an automatic shutdown sequence would be triggered. In the event of clogging, the flow would be diverted to the second vessel so that the product collected up to that point would not be contaminated. The reaction mixture was delivered to the vessel 105 and was stirred with compound 2e at room temperature. Two sample valves 103a and 104a were installed for taking samples for chromatography analysis of the reaction conversion, with one valve 103a after the first continuous flow 103 conduit and one valve 104a after the second continuous flow conduit 104.

The reaction mixture was stirred for 10 min in the collection vessel, and sample analysis showed a typical impurity profile, meaning that no unknown impurities were detected. Analysis of samples taken after the first continuous flow conduit using method A showed a very small amount of compound 2a remaining. Results of the residual amount of compound 2a detected in the process are shown in Table 2.

TABLE 2

Residual amount of compound 2a detected in the process

| | After first continuous flow conduit 103 (Method B-1) | After second continuous flow conduit 104 (Method A-1) | After 10 min in collection vessel (20° C.) | After 60 min in collection vessel (20° C.) |
|---|---|---|---|---|
| Residual compound 2a (wt %) | 0.36 | 0.06 | 0.12 | 0.12 |

Example 3

The experimental set-up 200 as schematically outlined in FIG. 2 was used. As shown in FIG. 2, a first vessel 201 is used for storing and providing the lithium bis(trimethylsilyl)amide solution (in THF), a second vessel 202 is used for storing and providing a compound 2a solution in tetrahydrofuran. A first continuous flow conduit 203 is used for mixing the lithium bis(trimethylsilyl)amide and compound 2a reagents and for delivering the reaction mixture to the next step. A second continuous flow conduit 204 is used to warm up the reaction mixture that flows out of the first continuous flow conduit 203 and to deliver the reaction mixture to the next step. A vessel 205 is used for carrying out the reaction of making compound 2e and for collecting the compound 2d that flows out of the second continuous flow conduit 204 so that compound 2e and compound 2d can react to form compound A. An additional vessel 206 is used for storing and providing a separate stream THF solution to be combined with the lithium bis(trimethylsilyl)amide solution (in THF).

During the reaction process, the lithium bis(trimethylsilyl)amide stock solution in THF was continuously added into the reaction process from the vessel 201 through a valve 201a and a separate THF stock solution was stored in vessel 206 and was continuously added into the reaction process to dilute the lithium bis(trimethylsilyl)amide in the flow stream before lithium bis(trimethylsilyl)amide was mixed with the compound 2a. The diluted lithium bis(trimethylsilyl)amide solution was pre-cooled to −30° C. before reaching the first continuous flow conduit 203. A The compound 2a stock solution in THF was continuously added into the reaction process from the vessel 202 through a valve 202a; the mixture of lithium bis(trimethylsilyl)amide (diluted) and compound 2a continuously flowed through the continuous flow conduit 203, which was is maintained at about −30° C. using a cooling bath 207. The reaction mixture flowed from the first continuous conduit 203 to the second continuous flow conduit 204, which was maintained at an ambient temperature or maintained between 20° C.-30° C. using a bath 208. The second continuous flow conduit 204 was used to warm up the reaction mixture that flowed out of the first continuous flow conduit 203. The reaction mixture was then delivered to a vessel 205. The vessel 205 was maintained at −5° C. to 5° C. and contained compound 2e. Compound 2d was then delivered from the second continuous conduit 204 into the vessel 205 to react with compound 2e. As illustrated in FIG. 2, a valve such as 201a, 202a, 204a, 206a can be used to fluidly couple to a vessel or to a continuous flow conduit to control the flow of the reaction solutions. Based on the reaction conditions, the set-up may include only one of the four valves 201a, 202a, 204a, and 206a; the set-up may include any two of the four valves 201a, 202a, 204a, and 206a; the set-up may include any three of the four valves 201a, 202a, 204a, and 206a; or the set-up may include all four valves 201a, 202a, 204a, and 206a. An additional valve 203a may be optionally added between the first continuous flow conduit and the second continuous flow conduit. The set-up shown in FIG. 2 can optionally include one or more other valves (not shown in the figure) to control the flow of the reaction at other points in the set-up.

When additional flow of THF was introduced into the flow from the third vessel 206 before combining the lithium bis(trimethylsilyl)amide and the compound 2a, dilution of the lithium amide may prevent blocking of the first continuous flow conduit maintained at lower temperatures and has therefor a positive influence on the robustness of the process. The flow setting was set to have the lithium bis(trimethylsilyl)amide to be 1.10 eq. of compound 2a, and the lithium bis(trimethylsilyl)amide (LHDMS) had a concentration of 17% after mixing with the separate steam of THF. A higher level of LHMDS with a molecular ration of 1.18 eq of compound 2a was also tested. Table 3 shows the results of the process with THF introduced to dilute the lithium amide.

After complete conversion the samples were converted to the final product using the active ester compound 2e to evaluate the product quality and impurity profile of the final product compound A. For sample derivatization the same stoichiometry and reaction conditions were used as for the batch compound A synthesis, and the product was analyzed from solution after amidation. The small-scale derivatization procedure for analysis method A shown in Table 1 was used, and samples were then compared to the data from the isolated product.

TABLE 3

Experiment parameters for reaction process with THF introduced to dilute the lithium amide

| | Sample 1 | Sample 2 | Sample 3 | Sample 3 (isolated) |
|---|---|---|---|---|
| LT(° C.) | −30 | −30 | −30 | −30 |
| RT (° C.) | 20 | 20 | 20 | 20 |
| LiHMDS (ml/min) | 1.46 | 1.57 | 1.46 | 1.46 |
| THF (ml/min) | 0.67 | 0.67 | 0.67 | 0.67 |
| Compound 2a (ml/min) | 3.89 | 3.89 | 3.89 | 3.89 |
| Compound 2a (g/g) | 27.12% | 27.12% | 27.12% | 27.12% |
| Time LT (sec) | 72.06 | 70.74 | 72.06 | 72.06 |
| Time RT (min) | 4.49 | 4.41 | 4.49 | 4.49 |
| Eq LiHMDS/compound 2a | 1.10 | 1.17 | 1.18 | 1.18 |
| Residual compound 2a (wt %) | 1.10 | 0.22 | 0.97 | NA |

TABLE 3-continued

Experiment parameters for reaction process with THF introduced to dilute the lithium amide

| | Sample 1 | Sample 2 | Sample 3 | Sample 3 (isolated) |
|---|---|---|---|---|
| Yield of compound A (method A) | 52.37% | 51.12% | 63.85% | 63.79% |
| By product (a %) | 2.8 | 4.4 | 2.7 | 0.86 |

In addition, high concentration of lithium bis(trimethylsilyl)amide may lead to an increase in the amount of by-product formed. One by-product can be formed via a-deprotonation followed by elimination when excessive lithium bis(trimethylsilyl)amide is used.

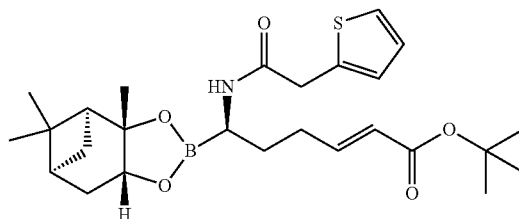

Compound S1

This by-product compound S1 is depleted by approx. 70% in the crystallization step of compound A. The presence of increased amounts of the by-product can lead to difficulties in the crystallization of compound A and have therefore a strong influence on product yield.

Another by-product resulting from the use of high concentration or excess of lithium salt such as (t-butyl lithium) may include the compound S2:

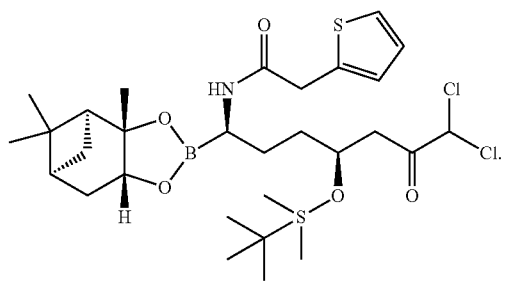

(S2)

Diluting the lithium amide flow with an additional stream of THF can help provide better control over the lithium amide concentration and stoichiochemistry. It also can help to enhance process robustness by preventing precipitation of LHMDS from blocking the continuous flow conduit.

Example 4

The experimental set-up as schematically outlined in FIG. 1 was used except that the residence time in the second continuous flow conduit was adjusted in the continuous flow process. The residence time in the second continuous flow conduit (room temperature) was compared at 4.5 min and about 15 min. The results showed that having a residence time of 15 mins in the second continuous flow conduit increased the conversion rate and the yield of compound A. The results also indicated that the synthesis of compound 2d in the continuous flow conduits can achieve full conversion and did not require an additional collecting vessel or stirring time at ambient temperature.

Example 5

The experimental set-up as schematically outlined in FIG. 1 was used. Direct synthesis of compound A using the flow process was tested using the following steps: a certain amount of active ester compound 2e was synthesized in the collection vessel 205 and the corresponding amount of compound 2d was collected in this vessel after flowing through the second continuous flow conduit 204. After the required material was collected, the reaction mixture was treated according to batch protocol and Compound A was isolated after distillation and crystallization. The results are shown in Table 4. In Table 4, the quality and yield of the isolated product was compared to the data from the derivatization method used in method B, and the results proved that the data from method B analysis were reliable.

TABLE 4

Experiment parameters for reaction process with direct synthesis of compound A in the collection vessel.

|  | Sample 1 | Sample 2 | Sample 2 (isolated) |
|---|---|---|---|
| LT(° C.) | −30 | −30 | −30 |
| RT (° C.) | 20 | 20 | 20 |
| LiHMDS (ml/min) | 1.6 | 1.6 | 1.6 |
| THF (ml/min) | 0.78 | 0.78 | 0.78 |
| Compound 2a (ml/min) | 3.57 | 3.57 | 3.57 |
| Compound 2a in THF (wt %) | 32 | 32 | 32 |
| Time LT (sec) | 72.06 | 72.06 | 72.06 |
| Time RT (min) | 15.06 | 15.06 | 15.06 |
| Eq LiHMDS/compound 2a | 1.11 | 1.11 | 1.11 |
| Residual compound 2a (wt %) | 0.70 | 0.63 | NA |
| Yield of compound A (method A) | 55.28% | 62.12% | 59.93% |
| By product (a %) | 3.0 | 3.2 | 0.94 |

The direct conversion of compound 2d to compound A can be achieved by collection of compound 2d in the active ester compound 2e solution in the vessel 205. This process leads to reduction of reaction time, simplifying the process, and increasing the overall productivity.

Example 7

The experimental set-up as schematically outlined in FIG. 2 was used. Direct synthesis of compound A using the flow process was tested using the following steps shown in Table 5. All material equivalents were calculated based on the compound 2a wt % measured from HPLC-CAD analysis. The amount of compound 2a in the THF measured using HPLC-CAD was about 45.5% (wt), 39.3 mmol, and about 20.3 g.

The values in the process were based on 45 g compound 2a, which equaled to a 20 min run (the vessels 101, 102, 105, and 106 were filled with an excess of solution to account for start-up and shut-down sequence). For comparison reason, the given values were based on steady state of the reaction.

TABLE 5

Reaction Parameters for the direct synthesis of compound A using a continuous flow process

| Step | Reagent |
|---|---|
| Equipment inertization | |
| Preparation of Feed Solutions | |
| Charging of compound 2a as 45% solution in THF to vessel 102 (compound 2a amount determined by HPLC) | Compound 2a in THF (45 g of compound 2a, volume 45 ml, 38.32 mmol) |
| Charging of THF to vessel 102 | THF (16.87 g, 19.08 ml, and 5.95 mol eq) |
| Charging TMSCl to vessel 102 | TMSCl (0.13 g, 0.12 ml, 0.18 mmol, and 0.03 mol eq) |
| Charging of LHMDS as 25% solution in THF to a vessel 101 Reagent amount/compound 2a (by weight) = about 1.37-the actually needed amount depends on assay of compound 2a and LHMDS solution and is controlled with HPLC analysis (e.g. method A) | LHMDS about 25% solution in THF (27.84 g, 31.17 ml, 43.25 mmol, and 1.10 mol eq) |
| Charging of THF to vessel 106 Reagent amount/compound 2a (by weight) = 0.60 Performed for about 30 min | THF (12.14 g, 13.73 ml, 168.29 mmol, 4.28 mol eq) |
| Preparation of ester solution compound 2e | |
| Charging of compound purified 2-thiophen-acetic acid | 2-thiophen-acetic acid (7.10 g, 49.94 mmol, 1.3 mol eq) |
| Charging of HOBt•H₂O | HOBt (7.97 g, 51.9 mmol, 1.3 mol eq) |
| Addition of acetonitrile-reactants to be suspended | Acetonitrile (31.75 g, 40.7 ml, 773.4 |

TABLE 5-continued

Reaction Parameters for the direct synthesis of compound A using a continuous flow process

| Step | Reagent |
| --- | --- |
| | mmol with a relative weight of about 2.01) |
| Cooling to −5 ° C. to 5 ° C. | |
| Addition of EDC•HCl in portions with cooling, so that a temperature of −5° C. to 5° C. can be maintained (minor exothermic reaction observed) | EDCl (11.91 g, 62.13 mmol, 1.6 mol eq) |
| Stirring of the resulting suspension for 2-5 h at −5° C.-5 ° C. | |
| *Continuous Flow Process to Prepare Compound 2d* | |
| Set temperature of cooling bath to −30° C. (first continuous flow conduit 103) | |
| Set temperature of warming-up bath to 20° C. (second continuous flow conduit 104) | |
| Startup of flow reactor: | |
| a) Set valve to waste stream vessel | |
| b) Set THF flow (pressure vessel 104) = 0.69 g/min | |
| c) Set compound 2a in THF flow (pressure vessel 101) = 3.21 g/min | |
| d) Set LHMDS/THF flow (pressure vessel 102) = 1.43 g/min | |
| e) Wait for constant flows/pressure | |
| f) Set valve to collection vessel | |
| HPLC (Method B): conversion of compound 2a after first continuous flow conduit run | |
| HPLC (Method B): Derivatization with active ester compound 2e | |
| Collection time: Collect reaction solution during stable state from the continuous flow conduit in vessel 105 for about 20 min | |
| Shut down of flow reactor: | |
| a) Set LHMDS/THF flow (pressure vessel 101) = 0 g/min | |
| b) Set compound 2a in THF flow (pressure vessel 102), 0 g/min | |
| c) Wait for last compound 2a in THF to reach end of flow reactor | |
| d) Set valve to waste stream vessel | |
| e) Flush flow reactor with THF to waste stream vessel | |
| f) Set THF flow (pressure vessel 106) = 0 g/min | |
| *Amide coupling (compound 2d-compound A)* | |
| Collect flow stream in active ester compound 2e solution obtained above at −5° C. to 5° C. can be maintained | Reaction mixture containing compound 2d (94.15 ml run for 20 min) |
| Stirring of reaction mixture for ≥3 h at −5° C. to 5° C. | |
| Warming of reaction mixture to 18° C. to 24° C.(overnight) | |
| *Extraction Work-up and Carbon filtration* | |
| Addition of 5% NaHCO₃ solution | 5% NaHCO₃ (about 47.8 g, 47.8 ml, 28.4 mmol, relative vol 2.36) |
| Addition of heptane | heptane (32.7 g, 47.7 ml, 327.1 mmol, relative vol 2.36) |
| Rinse line with heptane | heptane (318.48 g, 26.93 ml, 184.4 mmol, relative vol 1.33) |
| Phase separation-removal of lower aqueous layer | |
| Addition of 5% NaHCO₃ solution | 5% NaHCO₃ (about 47.8 g, 47.8 ml, 28.4 mmol, relative vol 2.36) |
| Phase separation-removal of lower aqueous layer | |
| Repeat the addition of NaHCO₃ solution and phase separation steps | |
| Addition of water | Water (47.8 g, 47.8 ml, 2652.4 mmol, rel. vol. 2.36) |
| Phase separation-removal of lower aqueous layer | |
| Filtration of product containing organic layer over Carbon Cartridge (Carbofil PHA/Filtrox) | Carbon (2.03 g, rel. wt. 0.10) |
| Rinse of filter with heptane | heptane (16.4 g, 23.9 ml, 163.6 mmol, rel. vol. 1.18) |
| *Extractive work-up and carbon filtration* | |
| Distillative concentration in vacuo at <40° C. until target volume 80 mL/33.9 g (compound 2a 100% conversion) Lab: T M = 40° C./300-200 mbar | Target col. 47.78 ml (rel vol 2.36) |
| Addition of heptane | heptane (47.1 g, 68.7 ml, relative vol 3.39) |
| Check for crystallization initialization (if necessary, addition of seeds) | Compound A seeds (0.006 g, 0.01 mmol) |
| Distillative concentration in vacuo at <40° C. until target volume about 115 mL/33.9 g Lab: T M = 40° C./180-130 mbar | Target col. 68.7 ml (rel vol 3.39) |

TABLE 5-continued

Reaction Parameters for the direct synthesis of compound A using a continuous flow process

| Step | Reagent |
|---|---|
| Addition of heptane | heptane (47.1 g, 68.7 ml, relative vol 3.39) |
| Distillative concentration in vacuo at <40° C. until target volume about 115 mL/33.9 g Lab: T M = 40° C./130-95 mbar | Target col. 68.7 ml (rel vol. 3.39) |
| Addition of heptane | heptane (47.1 g, 68.7 ml, relative vol 3.39) |
| Distillative concentration in vacuo at <40° C. until target volume about 115 mL/33.9 g Lab: T M = 40° C./95 mbar | Target col. 68.7 ml (rel vol. 3.39) |
| Addition of heptane | heptane (47.1 g, 68.7 ml, relative vol 3.39) |
| GC analysis: Acetonitrile ≤ 0.10 wt % (on heptane) If necessary, repeat last cycle of heptane addition + distillation Crystallization | |
| Stirring of product suspension for 1 h at 18-24° C. Cooling to −5-5° C. (alternatively: −15° C.} Stirring for 2 h Product filtration | |
| Washing of filter cake with cold heptane (in portions) | heptane (46.3 g, 67.4 ml) |
| Product Drying | |
| Drying of wet product in vacuo at <45° C. LOD analysis: ≤1.0% OLD | |
| Discharging of dry product compound A | Compound A (14.62 g, 23.6 mmol) |

Example 8

The experimental set-up as schematically outlined in FIG. 2 was used. Direct synthesis of compound A using the flow process was tested using the following steps shown in Table 6. All material equivalents were calculated based on the compound 2a wt % measured from HPLC-CAD analysis. The amount of compound 2a in the THF measured using HPLC-CAD was about 53.2% (wt), 40.4 mmol, and about 20.8 g.

The values in the process were based on 39.1 g compound 2a, which equaled to a 20 min run (the vessels 101, 102, 105, and 106 were filled with an excess of solution to account for start-up and shut-down sequence). For comparison reason, the given values were based on steady state of the reaction.

TABLE 6

Reaction Parameters for the direct synthesis of compound A using a continuous flow process

| Step | Reagent |
|---|---|
| Equipment inertization | |
| Preparation of Feed Solutions | |
| Charging of compound 2a as 53% solution in THF to vessel 102 (compound 2a amount determined by HPLC) Reagent amount/compound 2a = 1.89 | Compound 2a in THF (39.1 g of compound 2a, volume 41.16 ml, 40.24 mmol) |
| Charging of THF to vessel 102 Reagent amount/compound 2a (by weight) = 0.83 | THF (25.82 g, 29.21 ml, and 8.9 mol eq) |
| Charging of LHMDS as 19% solution in THF to a vessel 101 Reagent amount/compound 2a (by weight) = about 1.77-the actually needed amount depends on assay of compound 2a and LHMDS solution and is controlled with HPLC analysis (e.g. method A) | LHMDS about 19% solution in THF (35.35 g, 39.58 ml, 42.25 mmol, and 1.05 mol eq) |
| Preparation of ester solution-compound 2e | |
| Charging of compound purified 2-Thienylacetic acid | 2-Thienylacetic acid (7.27 g, 51.10 mmol, 1.27 mol eq) |
| Charging of HOBt•H$_2$O | HOBt (8.16 g, 53.12 mmol, 1.32 mol eq) |

TABLE 6-continued

Reaction Parameters for the direct synthesis of compound A using a continuous flow process

| Step | Reagent |
| --- | --- |
| Addition of acetonitrile-reactants to be suspended | Acetonitrile (32.49 g, 41.65 ml, 794.46 mmol with a relative weight of about 2.01) |
| Cooling to −5 °C. to 5 °C. | |
| Addition of EDC · HCl in portions with cooling, so that a temperature of −5° C. to 5° C. can be maintained (minor exothermic reaction observed) | EDCl (12.19 g, 63.59 mmol, 1.58 mol eq) |
| Stirring of the resulting suspension for 2-5 h at −5° C.-5° C. | |
| Continuous Flow Process to Prepare Compound 2d | |
| Set temperature of cooling bath to −10° C. (first continuous flow conduit 103) | |
| Set temperature of warming-up bath to 20° C. (second continuous flow conduit 104) | |
| Startup of flow reactor: | |
| a) Set valve to waste stream vessel | |
| b) Set THF flow (pressure vessel 104) = 0.69 g/min | |
| c) Set compound 2a in THF flow (pressure vessel 101) = 3.57 g/min | |
| d) Set LHMDS/THF flow (pressure vessel 102) = 1.87 g/min | |
| e) Wait for constant flows/pressure | |
| f) Set valve to collection vessel | |
| IPC-1 (HPLC): sampling after the first continuous flow conduit | |
| HPLC (Method B): conversion of compound 2a after first continuous flow conduit run (≤1% wt compound 2a left unreacted according to the reaction in batch) | |
| HPLC (Method B): Derivatization with active ester compound 2e | |
| Collection time: once stable-state achieved, collect reaction solution from the continuous flow conduit in vessel 105 for about 20 min | |
| Shut down of flow reactor: | |
| a) Set LHMDS/THF flow (pressure vessel 101) = 0 g/min | |
| b) Set compound 2a in THF flow (pressure vessel 102) = 0 g/min | |
| c) Wait for last compound 2a in THF to reach end of flow reactor | |
| d) Set valve to waste stream vessel | |
| e) Flush flow reactor with THF to waste stream vessel | |
| f) Set THF flow (pressure vessel 106) = 0 g/min (vessel only used for startup and shut down sequence) | |
| Amide coupling (compound 2d-compound A) | |
| Collect flow stream in active ester compound 2e solution obtained above at −5° C. to 5° C. can be maintained | Reaction mixture containing compound 2d (101.60 ml run for 20 min) |
| Stirring of reaction mixture for ≥3 h at −5° C. to 5° C. | |
| Warming of reaction mixture to 18° C. to 24° C. (overnight) | |
| Extraction Work-up and Carbon filtration | |
| Addition of 5% NaHCO₃ solution | 5% NaHCO₃ (about 48.98 g, 48.98 ml, 29. mmol, relative vol 2.36) |
| Addition of heptane | heptane (333.54 g, 48.89 ml, 334.69 mmol, relative vol 2.36) |
| Stir (15 min) and settle (15 min) | |
| Phase separation-removal of lower aqueous layer | |
| Addition of 5% NaHCO₃ solution | 5% NaHCO₃ (about 48.98 g, 48.98 ml, 29. mmol, relative vol 2.36) |
| Stir (15 min) and settle (15 min) | |
| Phase separation-removal of lower aqueous layer | |
| Repeat the addition of NaHCO₃ solution and phase separation steps | |
| Addition of water | Water (48.98 g, 48.98 ml, 29. mmol, relative vol 2.36) |
| Phase separation-removal of lower aqueous layer | |
| Extractive work-up and carbon filtration | |
| Distillative concentration in vacuo at <40° C. until target volume 80 mL/33.9 g (compound 2a 100% conversion) | Target col. 47.78 ml (rel vol. 2.36) |
| Addition of heptane | heptane (48.4 g, 70.55 ml, relative vol 3.39) |
| Check for crystallization initialization (if necessary, addition of seeds) | Compound A seeds (0.006 g, 0.01 mmol) |
| Distillative concentration in vacuo at <40° C. until target volume about 115 mL/33.9 g | Target col. 70.55 ml (rel vol. 3.39) |
| Lab: T M = 40° C./180-130 mbar | |

TABLE 6-continued

Reaction Parameters for the direct synthesis of compound A using a continuous flow process

| Step | Reagent |
|---|---|
| Addition of heptane | heptane (47.1 g, 68.7 ml, relative vol 3.39) |
| Distillative concentration in vacuo at <40° C. until target volume about 115 mL/33.9 g Lab: T M = 40° C./130-95 mbar | Target col. 70.55 ml (rel vol. 3.39) |
| Addition of heptane | heptane (48.4 g, 70.55 ml, relative vol 3.39) |
| Distillative concentration in vacuo at <40° C. until target volume about 115 mL/33.9 g Lab: T M = 40° C./95 mbar | Target col. 70.55 ml (rel vol. 3.39) |
| Addition of heptane | heptane (47.1 g, 68.7 ml, relative vol 3.39) |
| GC analysis: Acetonitrile ≤ 0.10 wt % If necessary, repeat last cycle of heptane addition + distillation | |
| Crystallization | |
| Stirring of product suspension for 1 h at 18-24° C. Cooling to −5-5° C. Stirring for 2 h Product filtration | |
| Washing of filter cake with cold heptane (in portions) | heptane (47.52 g, 69.27 ml) |
| Product Drying | |
| Drying of wet product in vacuo at <45° C. LOD analysis: ≤1.0% OLD | |
| Discharging of dry product compound A | Compound A (14.62 g, 23.6 mmol) |

The amount of compound A obtained was about 18.07 g, and the yield based on HPLC analysis is about 72.89%. The purity of the final product compound A, based on HPLC analysis was about 99.9%.

What is claimed is:

1. A process for production of a compound of Formula (Ia) or (Ib) or salt thereof,

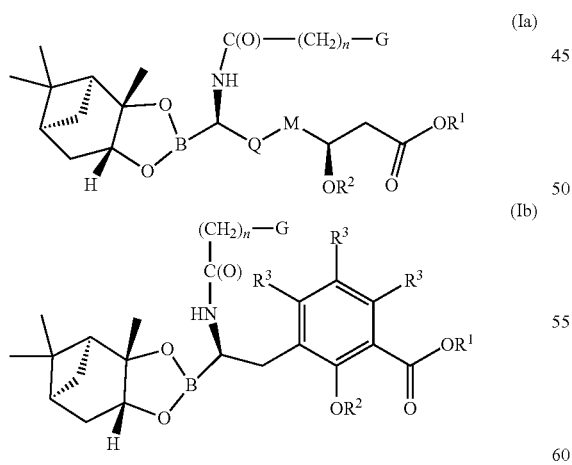

wherein:
Q is —(CH$_2$)$_m$—;
M is CH$_2$— or —CH═CH—;
m is 1 or 2;
R$^1$ is a carboxyl protecting group;
R$^2$ is a hydroxyl protecting group; or
R$^1$ and R$^2$ together with the atoms to which they are attached form a heterocyclic ring optionally substituted with C$_{1-4}$ alkyl;
each R$^3$ is independently selected from hydrogen, —OH, halogen, —CF$_3$, C$_1$-C$_6$ alkenyl, C$_1$-C$_6$ alkynyl, C$_1$-C$_6$ heteroalkyl, C$_3$-C$_7$ carbocyclyl, 5-10 membered heterocyclyl, C$_{6-10}$ aryl, 5-10 membered heteroaryl, cyano, C$_1$-C$_6$ alkoxy(C$_1$-C$_6$)alkyl, C$_{6-10}$ aryloxy, sulfhydryl (mercapto), and —(CH$_2$)$_{m'}$—Y'—(CH$_2$)$_p$M';
m' and p are independently 0 to 3;
Y' is selected from the group consisting of —S—, —S(O)—, —S(O)$_2$—, —O—, —CR$^{4a}$R$^{5a}$—, and —NR$^{1a}$—;
M' is selected from the group consisting of C(O)NR$^{1a}$R$^{2a}$; —C(O)NR$^{1a}$OR$^{3a}$; —NR$^{1a}$C(O)R$^{4a}$; —NR$^{1a}$C(O)NR$^{2a}$R$^{1b}$; —NR$^{1a}$C(O)OR$^{3a}$; —NR$^{1a}$S(O)$_2$R$^{3a}$; —NR$^{1a}$S(O)$_2$NR$^{2a}$R$^{1b}$; —C(═NR$^{1a}$)R$^{4a}$; —C(═NR$^{1a}$)NR$^{2a}$R$^{1b}$; —NR$^{1a}$CR$^{4a}$(═NR$^{2a}$); —NR$^{1a}$C(═NR$^{2a}$)NR$^{1b}$R$^{2b}$; C$_{1-4}$ alkyl optionally substituted with 0-2 substituents selected from the group consisting, —OR$^{3a}$, halogen, —C(O)NR$^{1a}$R$^{2a}$; and —NR$^{1a}$C(O)R$^{4a}$; C$_{3-10}$ cycloalkyl optionally substituted with 0-2 substituents selected from the group consisting of C$_{1-4}$ alkyl, —OR$^{3a}$, —NR$^{1a}$R$^{2a}$, halogen, —C(O)NR$^{1a}$R$^{2a}$, and —NR$^{1a}$C(O)R$^{4a}$; C$_{6-10}$ aryl optionally substituted with 0-2 substituents selected from the group consisting of C$_{1-4}$ alkyl, —OR$^{3a}$, —NR$^{1a}$R$^{2a}$, halogen, —C(O)NR$^{1a}$R$^{2a}$; and —NR$^{1a}$C(O)R$^{4a}$; 5 to 10 membered heteroaryl optionally substituted with 0-2 substituents selected from the group consisting of C$_{1-4}$ alkyl, —OR$^{3a}$, —NR$^{1a}$R$^{2a}$, halogen, —C(O)NR$^{1a}$R$^{2a}$, and —NR$^{1a}$C(O)R$^{4a}$; and 4 to 10 membered heterocyclyl optionally substituted with 0-2 substituents selected from the group consisting of $C_{1-4}$ alkyl, —$OR^{3a}$, —$NR^{1a}R^{2a}$, halogen, —$C(O)NR^{1a}R^{2a}$, and —$NR^{1a}C(O)R^{4a}$;

each $R^{1a}$, $R^{2a}$, $R^{1b}$ and $R^{2b}$ are independently selected from the group consisting of —H, optionally substituted —$C_{1-10}$alkyl, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl;

$R^{3a}$ is hydrogen, optionally substituted $C_{1-10}$alkyl, -optionally substituted $C_{1-10}$alkyl-COOH, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl; and each $R^{4a}$ and $R^{5a}$ is independently selected from the group consisting of —H, —OH, optionally substituted alkoxyl, optionally substituted —$C_{1-10}$alkyl, optionally substituted $C_{2-10}$alkenyl, optionally substituted $C_{2-10}$alkynyl, optionally substituted $C_{3-7}$ cycloalkyl, optionally substituted 3-8 membered heterocyclyl, optionally substituted $C_{6-10}$aryl, and optionally substituted 5-10 membered heteroaryl;

n is 0 to 3;

G is selected from the group consisting of —$NR^1R^2$, —$N_3$, —$C(O)NR^1R^2$, —$S(O)_2NR^1R^2$, —$SR^3$, —$OR^3$, —$NR^1C(O)R^5$, —$C(=NOR^3)$—X, $C(=NOR^3)$—Z, —$C(O)OR^3$, —$C(O)NR^1(OR^3)$, —$NR^1(OR^3)$, —$NR^1C(O)R^5$, —$NR^1C(O)NR^2R^{1a}$, —$NR^1C(O)OR^3$, $S(O)_2R^3$, —$NR^1S(O)_2NR^2R^{1a}$, —$NR^1NR^2R^{1a}$, —$C(O)NR^1NR^2R^{1a}$, —$S(O)_2NR^1NR^2R^{1a}$, —$C(=NR^1)R^5$, —$C(=NR^1)NR^2R^{1a}$, —$NR^1CR^5(=NR^2)$, —$NR^C(=NR^2)NR^{1a}R^{2a}$, optionally substituted $C_{1-10}$ alkyl, optionally substituted $C_{2-10}$alkenyl, optionally substituted $C_{2-10}$alkynyl, optionally substituted $C_{3-7}$ carbocyclyl, optionally substituted 5-10 membered heterocyclyl, optionally substituted $C_{6-10}$aryl, optionally substituted 5-10 membered heteroaryl, optionally substituted $C_{1-6}$alkylene-$C_{3-7}$carbocyclyl, optionally substituted $C_{1-6}$alkylene-5-10 membered heterocyclyl, optionally substituted $C_{1-6}$alkylene-$C_{6-10}$aryl, and optionally substituted $C_{1-6}$alkylene-5-10 membered heteroaryl;

X is hydrogen or optionally substituted $C_{1-9}$alkyl;

Z is selected from optionally substituted $C_{3-8}$ cycloalkyl, optionally substituted heterocyclyl, optionally substituted aryl, optionally substituted heteroaryl;

the process comprising:

providing a continuous flow of a lithium amide, wherein the lithium amide is cooled to a temperature in the range of about −80° C. to about −10° C.;

providing a continuous flow of a compound of Formula (IIa) or (IIb) or salt thereof;

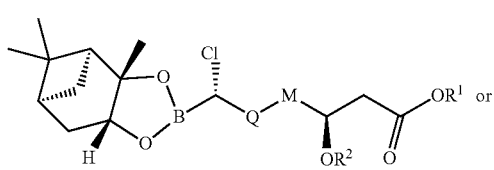

(IIa)

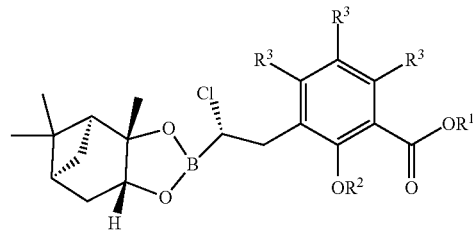

(IIb)

combining the continuous flow of the pre-cooled lithium amide and the continuous flow of the compound of Formula (IIa) or (IIb) at a first continuous flow conduit at a first temperature to yield a first reaction intermediate;

transitioning the first reaction intermediate to a second temperature to yield a second reaction intermediate; and combining the second reaction intermediate and a compound of Formula (III) downstream of a second continuous flow conduit to yield the compound of Formula (Ia) or (Ib) or salt thereof $$A\text{-}O\text{—}C(O)\text{—}(CH_2)_nG \quad (III)$$

wherein A is a $C_{6-10}$aryl, 5-10 membered heteroaryl, $C_{3-7}$ carbocyclyl, or 5-10 membered heterocyclyl; and comprising flowing the lithium amide in the first continuous flow conduit at a flow rate of about 0.1 ml/min to about 5.0 ml/min.

2. The process of claim 1, wherein transitioning the first reaction intermediate to the second temperature comprises delivering the first reaction intermediate to the second continuous flow conduit at the second temperature to yield the second reaction intermediate.

3. The process of claim 1, wherein M is —$CH_2$— and Q is —$CH_2$— or —$CH_2$—$CH_2$—.

4. The process of claim 1, wherein M is —CH=CH— and n is 1.

5. The process of claim 1, comprising producing a compound of Formula (Ia).

6. The process of claim 1, comprising producing a compound of Formula (Ib).

7. The process of claim 1, wherein n is O.

8. The process of claim 1, wherein G is —$CH_2$-thiophene.

9. The process of claim 1, wherein the compound of Formula (Ib) is

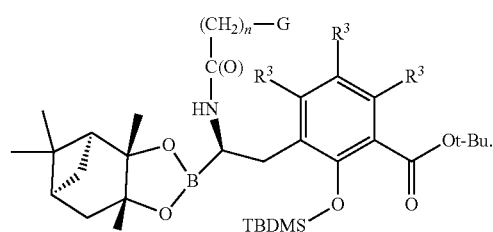

(Ib)

10. The process of claim 1, wherein the compound of Formula (Ia) is

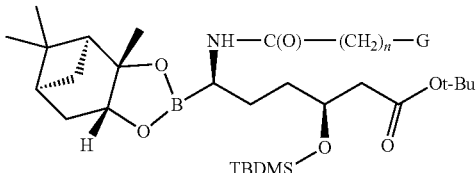

or salt thereof.

11. The process of claim 1, wherein the compound of Formula (IIa) is

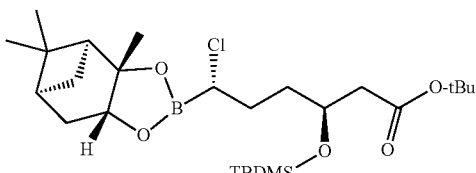

or salt thereof.

12. The process of claim 1, wherein the second reaction intermediate is collected into a vessel and the vessel does not have continuous outflow.

13. The process of claim 1, wherein the lithium amide is lithium bis(trimethylsilyl)amide.

14. The process of claim 1, wherein the continuous flow of the lithium amide is a continuous flow of the lithium amide in tetrahydrofuran.

15. The process of claim 14, further comprising
providing a continuous flow of tetrahydrofuran; and
combining the continuous flow of the lithium amide in tetrahydrofuran and the continuous flow of tetrahydrofuran prior to combining the continuous flow of the lithium amide and the continuous flow of the compound of Formula (IIa) or (IIb) in the first continuous flow conduit.

16. The process of claim 1, wherein the continuous flow of the compound of Formula (IIa) or (IIb) is a continuous flow of the compound of Formula (IIa) or (IIb) in tetrahydrofuran.

17. The process of claim 1, further comprising preparing the lithium amide and the compound of Formula (IIa) or (IIb) under a nitrogen or argon atmosphere.

18. The process of claim 1, comprising preparing the tetrahydrofuran under a nitrogen or argon atmosphere.

19. The process of claim 1, wherein the lithium amide and the compound of Formula (IIa) or (IIb) are substantially free of water.

20. The process of claim 14, wherein the tetrahydrofuran is substantially free of water.

21. The process of claim 1, comprising cooling the lithium amide to a temperature in the range of about −50° C. to −20° C. prior to the combining of the continuous flow of the lithium amide and the continuous flow of the compound of Formula (IIa) or (IIb).

22. The process of claim 15, comprising pre-cooling the tetrahydrofuran to a temperature in the range of about −80° C. to about −10° C. prior to the combining of the continuous flow of the lithium amide and the continuous flow of tetrahydrofuran.

23. The process of claim 1, comprising pre-cooling the compound of Formula (IIa) or (IIb) to a temperature in the range of about −80° C. to about −10° C. prior to the combining of the continuous flow of the lithium amide and the continuous flow of the compound of Formula (IIa) or (IIb).

24. The process of claim 1, comprising pre-cooling the compound of Formula (IIa) or (IIb) to a temperature in the range of about −50° C. to 0° C. prior to the combining of the continuous flow of the lithium amide and the continuous flow of the compound of Formula (IIa) or (IIb).

25. The process of claim 1, wherein the first temperature of the first continuous flow conduit is in the range of about −50° C. to about 0° C.

26. The process of claim 1, wherein the first temperature of the first continuous flow conduit is in the range of about −20° C. or about 0° C.

27. The process of claim 2, wherein the second temperature of the second continuous flow conduit is in the range of about 5° C. to about 50° C.

28. The process of claim 2, wherein the second temperature of the second continuous flow conduit is about 15° C. or 40° C.

29. The process of claim 2, wherein the second temperature of the second continuous flow conduit is room temperature.

30. The process of claim 1, comprising maintaining the first continuous flow conduit at a temperature in the range of about −80° C. to about −15° C. during the process.

31. The process of claim 2, comprising maintaining the second continuous flow conduit at a temperature in the range of about 5° C. to about 50° C.

32. The process of claim 1, wherein a flow time in the first continuous flow conduit is about 5 seconds to about 100 seconds.

33. The process of claim 2, wherein a flow time in the second continuous flow conduit is about 5 seconds to about 50 seconds.

34. The process of claim 1, wherein the molar ratio of the lithium amide to the compound of Formula (IIa) or (II %) is in the range of about 5:1 to about 1:5.

35. The process of claim 34, wherein the molar ratio of the lithium amide to the compound of Formula (IIa) or (IIb) is about 1:1 to 1.2:1.

36. The process of claim 1, wherein the lithium amide flow rate is about 1.6 ml/min.

37. The process of claim 15, comprising flowing the tetrahydrofuran into the first continuous flow conduit at a flow rate of about 0.25 ml/min to about 2 ml/min.

38. The process of claim 37, wherein the tetrahydrofuran flow rate is about 0.8 ml/min.

39. The process of claim 2, further comprising flowing the compound of Formula (IIa) or (IIb) into the second continuous flow conduit at a flow rate of about 0.1 ml/min to about 5 ml/min.

40. The process of claim 39, wherein the Formula (Ha) or (I %) flow rate is about 2.0 ml/min.

41. The process of claim 2, wherein the second intermediate flows out of the second continuous flow conduit into a collection vessel, and wherein the collection vessel comprises the compound of Formula (III).

42. The process of claim 1, wherein the combining the second reaction intermediate and the compound of Formula (III) is not performed in a continuous flow conduit.

43. The process of claim 1, further comprising combining the compound of Formula (IIa) or (IIb) and tetrahydrofuran to prepare a compound of Formula (IIa) or (IIb) stock solution for the continuous flow of the compound of Formula (IIa) or (IIb).

44. The process of claim 43, further comprising pressurizing a vessel comprising the compound of Formula (IIa) or (IIb) stock solution.

45. The process of claim 1, further comprising pressurizing a vessel comprising the lithium amide solution.

46. The process of claim 1, further comprising preparing a stock solution of tetrahydrofuran and pressurizing a vessel comprising the stock solution of tetrahydrofuran.

* * * * *